(12) United States Patent
Kuwajima

(10) Patent No.: US 8,289,654 B2
(45) Date of Patent: Oct. 16, 2012

(54) HEAD ASSEMBLY, MAGNETIC DISK DRIVE APPARATUS AND ROTATION MECHANISM

(75) Inventor: Hideki Kuwajima, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 77 days.

(21) Appl. No.: 12/950,615

(22) Filed: Nov. 19, 2010

(65) Prior Publication Data
US 2011/0211274 A1    Sep. 1, 2011

(30) Foreign Application Priority Data

Dec. 3, 2009 (JP) ................................ 2009-275321
Oct. 27, 2010 (JP) ................................ 2010-240728

(51) Int. Cl.
*G11B 21/21* (2006.01)
(52) U.S. Cl. ...................................................... 360/254
(58) Field of Classification Search .................. 360/254
See application file for complete search history.

(56) References Cited

U.S. PATENT DOCUMENTS

| 6,724,580 | B2* | 4/2004 | Irie et al. ................. 360/294.4 |
| 6,765,766 | B2* | 7/2004 | Hipwell, Jr. et al. ....... 360/294.5 |
| 7,006,333 | B1* | 2/2006 | Summers .................. 360/294.4 |
| 7,375,911 | B1* | 5/2008 | Li et al. ........................ 360/75 |
| 7,957,101 | B2* | 6/2011 | Matsui et al. .............. 360/245.9 |
| 2008/0297948 | A1 | 12/2008 | Yao | |

FOREIGN PATENT DOCUMENTS

| JP | A-2001-052456 | 2/2001 |
| JP | A-2002-324374 | 11/2002 |
| JP | A-2008-293636 | 12/2008 |

\* cited by examiner

*Primary Examiner* — Mark Blouin
(74) *Attorney, Agent, or Firm* — Oliff & Berridge, PLC

(57) ABSTRACT

A head assembly includes a slider having a head element, a load beam, a fulcrum formed at a top end section of the load beam, a slider support plate for supporting the slider to freely turn around the fulcrum, at least one drive element for applying a turning force to the slider support plate in a plane thereof, a first linear link part having at both ends a first top end joint part mechanically connected to the slider support plate, and a first base end joint part mechanically connected to the load beam, and a second linear link part having at both ends a second top end joint part mechanically connected to the slider support plate, and a second base end joint part mechanically connected to the load beam. Both of an extended line of the first linear link part and an extended line of the second linear link part travel toward a position of the fulcrum and intersect with each other.

11 Claims, 22 Drawing Sheets

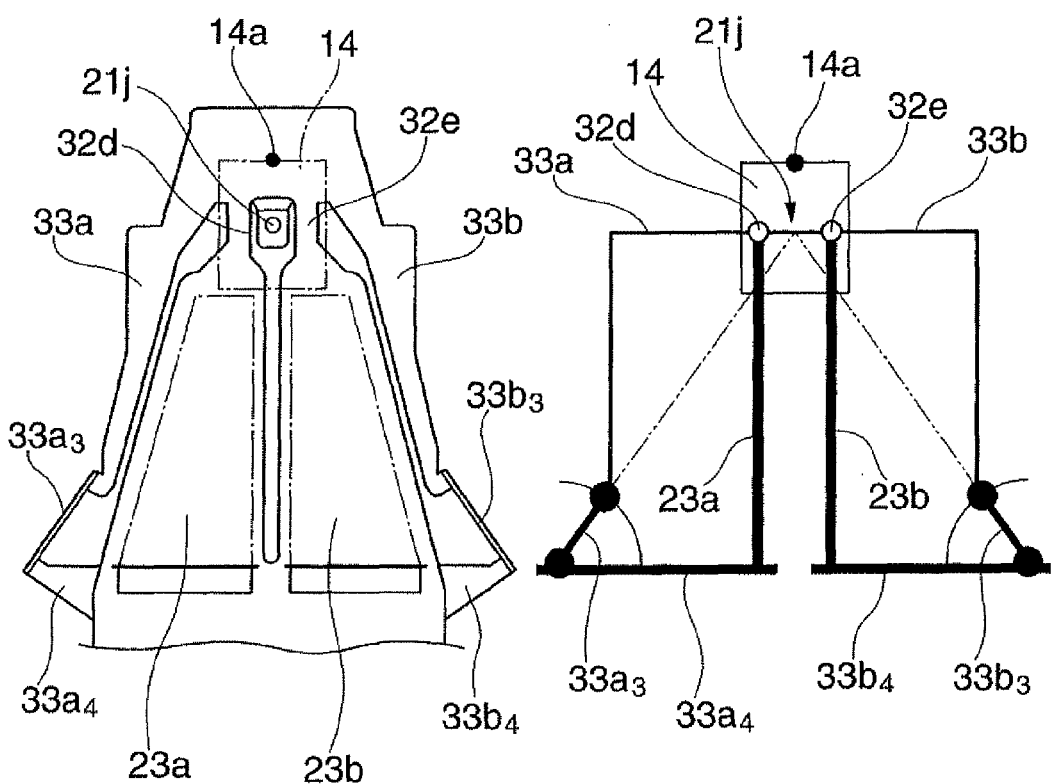

HEAD ASSEMBLY, MAGNETIC DISK DRIVE APPARATUS AND ROTATION MECHANISM

BACKGROUND OF THE INVENTION

1. Field of the Invention

The present invention relates to a head assembly suitable for attaining higher recording density of a magnetic disk drive apparatus used in such as a storage apparatus of a computer, to a magnetic disk drive apparatus with the head assembly, and to a rotation or turning mechanism.

2. Description of the Related Art

Recently, the recording density of a magnetic disk used in a magnetic disk drive apparatus becomes increasingly higher. Such magnetic disk drive apparatus has generally a slider on which a magnetic head for recording and/or reproducing data in/from the magnetic disk is mounted. The slider is supported by a head support mechanism. The head support mechanism has a head-actuator arm to which the slider is attached. This head-actuator arm is able to turn by a voice coil motor (VCM). Positioning of the magnetic head mounted on the slider to an arbitrary position on the magnetic disk is performed by controlling the VCM.

In order to record data on a magnetic disk with much higher density, it is required to make the positioning of the magnetic head on the magnetic disk more precise. However, in case that the head-actuator arm is merely turned by the VCM to position the magnetic head, the positioning of the magnetic head cannot be made precise so much.

Japanese patent publication 2002-324374A discloses a technology of finely displacing a magnetic head (micro-displacement mechanism). According to this technology, a slider support plate with a slider mounted thereon is supported to be able to turn by elastic hinge sections and thin-film piezoelectric elements, which are provided at the top end section of a head-actuator arm for applying a turning force to the slider support plate so as to position the magnetic head with high precision.

FIG. 22a shows the structure of the micro-displacement mechanism described in Japanese patent publication 2002-324374A, and FIG. 22b explains the displacement operation in this micro-displacement mechanism.

As shown in FIG. 22a, in this micro-displacement mechanism, first and second thin-film piezoelectric elements 221a and 221b are mounted on first and second piezoelectric-body support sections 220a and 220b of a flexible wiring substrate, respectively. The first and second piezoelectric-body support sections 220a and 220b are connected to a slider support plate 220e through, respectively, elastic hinge sections 220c and 220d, each having a slender shape in the middle. The slider support plate 220e is configured to turn around a fulcrum protrusion 222, and a slider 224 having a magnetic head 223 is fixed on the slider support plate 220e.

As shown in FIG. 22b diagrammatically, the first piezoelectric-body support section 220a and the first thin-film piezoelectric element 221a constitute a first beam B1, and the second piezoelectric-body support section 220b and the second thin-film piezoelectric element 221b constitute a second beam B2. The top end section of the slider support plate 220e constitutes a link L, the fulcrum protrusion 222 constitutes a turning center O, and the slider 224 constitutes an arm A1 integrated with the link L having a length of d, and the head element 223 exists at the top end of the arm A1. The link L is capable of rotating or turning relatively to the first beam B1 and the second beam B2 at its both ends. The reason for the first and second beams B1 and B2 being capable of turning at their tops comes from existence of the elastic hinge sections 220c and 220d. The elastic hinge sections 220c and 220d constitute swing fulcrums C1 and C2, respectively. The elastic hinge sections 220c and 220d have a structure flexible both in a pitching direction and a rolling direction, which can give to the slider 224 excellent flying characteristics above the magnetic disk.

Japanese patent publication 2008-293636A discloses a technology of preventing deformation of a suspension and separation from a dimple (fulcrum protrusion) during manufacturing processes or when an impact is applied. In this technology, an outrigger composed of a pair of rigid beams and a pair of spring beams is provided for supporting a slider support plate, in a micro-displacement mechanism similar to that of Japanese patent publication 2002-324374A.

Japanese patent publication 2001-052456A discloses another technology of finely displacing a magnetic head for positioning the magnetic head with high precision. According to this technology, a pair of plate-shaped arm parts each composed of a plate-shaped elastic body are provided at the top end section of a load beam also composed of a plate-shaped elastic body for supporting a slider mounting part, and piezoelectric thin films provided on the pair of plate-shaped arm parts are driven.

However, according to the micro-displacement mechanism disclosed in Japanese patent publication 2002-324374A, the following problems may arise when performing loading operation in which the slider 224 moves above the magnetic disk and unloading operation in which the slider 224 saves from the magnetic disk.

At the time of the loading operation and the unloading operation of the slider, it is necessary that an attitude angle of the slider, that is, the attitude angle in the rolling direction and the pitching direction has to be set precisely. However, since the elastic hinge sections 220c and 220d in the micro-displacement mechanism of Japanese patent publication 2002-324374A are composed of wiring members and coating resin, these elastic hinge sections are easily deformed although they are flexible. Therefore, it has been difficult to ensure stability in fine adjustment of the attitude angle of the slider, and to regulate this attitude angle. Moreover, because the preload or internal force of pushing the slider support plate with the mounted slider against the fulcrum protrusion is small, the slider support plate is easily separated from the fulcrum protrusion, resulting in possibility that the attitude angle of the slider may become unstable at the time of loading operation and unloading operation and that the magnetic disk may be damaged.

According to the micro-displacement mechanism disclosed in Japanese patent publication 2008-293636A, by providing springy outriggers, deformation of suspension and separation from the dimple can be prevented, but at the same time the outriggers will restrict the micro-displacement operation of the slider, to spoil displacement performance of the head. Furthermore, since the outriggers have to be spring-deformed when turn the slider, required is to provide a large driving force.

Whereas according to the micro-displacement mechanism disclosed in Japanese patent publication 2001-052456A, since the slider is supported only by a pair of plate-shaped arm parts made of an elastic material, the bending rigidity of the elastic material becomes larger than that of the piezoelectric element and therefore it is impossible to obtain sufficient displacement. Also, it is difficult to stably keep the attitude angle of the slider at the time of loading operation and unloading operation.

SUMMARY OF THE INVENTION

The present invention has been developed for solving the above-described problems of the related art. It is therefore an object of the present invention to provide a head assembly, which, without affecting the displacement characteristics of a head, achieves adjustment and stability of the attitude angle of a slider, and can write and read data with high recording density, to provide a magnetic disk drive apparatus with the head assembly, and to provide a rotation mechanism.

According to the present invention, a head assembly includes a slider having a head element, a load beam, a fulcrum formed at a top end section of the load beam, a slider support plate for supporting the slider to freely turn around the fulcrum, at least one drive element for applying a turning force to the slider support plate in a plane thereof, a first linear link part having at both ends a first top end joint part mechanically connected to the slider support plate, and a first base end joint part mechanically connected to the load beam, and a second linear link part having at both ends a second top end joint part mechanically connected to the slider support plate, and a second base end joint part mechanically connected to the load beam. Both of an extended line of the first linear link part and an extended line of the second linear link part travel toward a position of the fulcrum and intersect with each other.

Both of the extended lines of the first and second link parts travel toward the fulcrum position supporting the slider to freely turn and intersect with each other. Therefore, it is possible to have sufficient rigidity in the rolling direction and the pitching direction and to secure an amount of displacement of the head without giving turning load for the turning movement of the slider in the yawing direction. Also, because a preload or internal force of pushing the slider against the fulcrum protrusion is ensured, stabilized control of the attitude angle of the slider can be achieved avoiding occurrence of damage in disk under the loading/unloading operation. That is, when micro-displacement control of the head is required for tracking correction on the magnetic disk, it is possible to maintain the response characteristics of the head at high speed with high precision. Furthermore, it is possible to provide a head assembly and a magnetic disk drive apparatus in which the number of components is reduced to have reduced weight and reduced size. Moreover, since the slider and the slider support plate turn around the fulcrum protrusion, pressure and load on the drive element during operation are greatly reduced, causing deterioration or damage of the drive element to prevent from occurrence. As a result, it is possible to greatly improve durability of the head assembly.

It is preferred that an intersected point of the extended line of the first linear link part and the extended line of the second linear link part substantially lies at the position of the fulcrum.

It is also preferred that the first linear link part and the second linear link part constitute a rigid linking structure having difficulty in deformation of shape, or that the first linear link part and the second linear link part constitute an elastic coupling structure having ease in deformation of shape.

It is further preferred that each of the first linear link part and the second linear link part is formed by bending a part of a plate member integrally formed with the slider support plate. This enables a link mechanism to be formed with a simple structure.

It is still further preferred that a bending direction of the part of the plate member integrally formed with the slider support plate is a direction to a surface of the plate member opposite to a surface on which the at least one drive element is mounted. Bending to this direction can prevent the occurrence of inconvenience, such as vibration caused by resonance at a specific frequency.

It is further preferred that the first top end joint part, the first base end joint part, the second top end joint part and the second base end joint part comprise portions with locally weakened rigidity. This makes the mechanical load of the slider in the yawing direction smaller as much as possible to smoothly perform fine positioning of the head.

It is preferred that the head assembly further includes a flexure with elasticity supported by the load beam, wherein the flexure is integrally formed with the slider support plate so that the slider support plate freely turns. In this case, more preferably, the head assembly further includes a pair of first and second outrigger parts integrally formed with the slider support plate and the flexure to couple the flexure to the slider support plate, wherein the first and second linear link parts are configured by portions of the first and second outrigger parts, respectively.

It is further preferred that the at least one drive element comprises at least one thin-film piezoelectric element fixed to a top end section of the flexure.

According to the present invention, also, a magnetic disk drive apparatus includes a head assembly, and a magnetic disk. The head assembly includes a slider having a head element, a load beam, a fulcrum formed at a top end section of the load beam, a slider support plate for supporting the slider to freely turn around the fulcrum, at least one drive element for applying a turning force to the slider support plate in a plane thereof, a first linear link part having at both ends a first top end joint part mechanically connected to the slider support plate, and a first base end joint part mechanically connected to the load beam, and a second linear link part having at both ends a second top end joint part mechanically connected to the slider support plate, and a second base end joint part mechanically connected to the load beam. Both of an extended line of the first linear link part and an extended line of the second linear link part travel toward a position of the fulcrum and intersect with each other. The head assembly flies above a surface of the magnetic disk in operation.

According to the present invention, further, a rotation or turning mechanism includes a base substrate, a fulcrum formed on the base substrate, a support plate for supporting an object to be turned so that the object is capable of freely turning around the fulcrum, at least one drive element for applying a turning force to the support plate in a plane thereof, a first linear link part having at both ends a first top end joint part mechanically connected to the support plate, and a first base end joint part mechanically connected to the base substrate, and a second linear link part having at both ends a second top end joint part mechanically connected to the support plate, and a second base end joint part mechanically connected to the base substrate. Both of an extended line of the first linear link part and an extended line of the second linear link part travel toward a position of the fulcrum and intersecting with each other.

It is preferred that an intersected point of the extended line of the first linear link part and the extended line of the second linear link part substantially lies at the position of the fulcrum.

Further objects and advantages of the present invention will be apparent from the following description of the preferred embodiments of the invention as illustrated in the accompanying drawings.

BRIEF DESCRIPTION OF THE DRAWINGS

FIG. 11a is a diagram schematically illustrating configurations of the link part and a joint part in the embodiment of FIG. 1;

FIG. 11b is a diagram illustrating operation of the link part and the joint part in the embodiment of FIG. 1;

FIG. 12b is a waveform diagram of a drive voltage applied to the thin-film piezoelectric elements of FIG. 12a;

DESCRIPTION OF THE PREFERRED EMBODIMENTS

Figure 1:
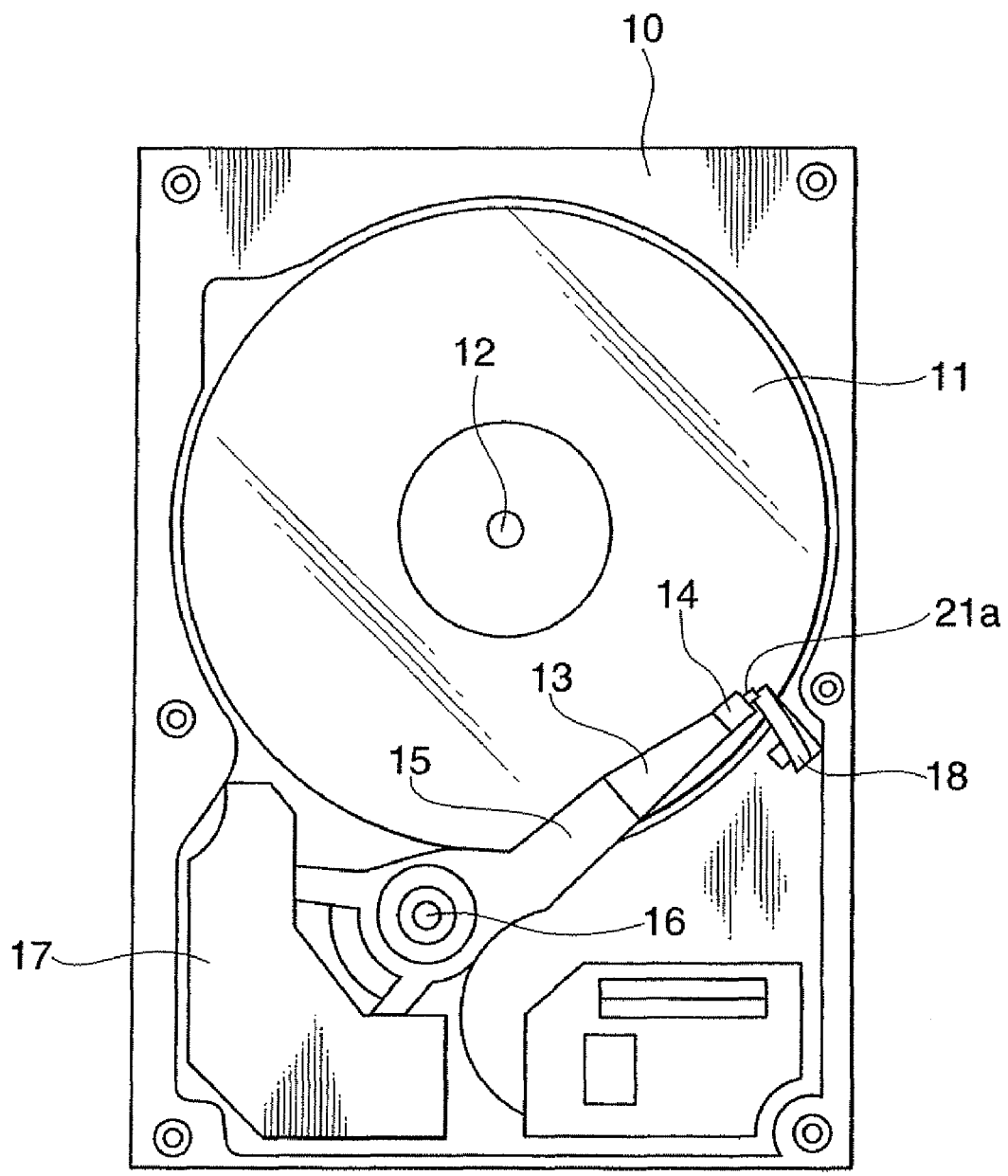
FIG. 1 is a plan view schematically illustrating overall structure of a load/unload type hard disk drive (HDD) apparatus as an embodiment of a magnetic disk drive apparatus according to the present invention.

FIG. 1 schematically illustrates the overall structure of a load/unload type HDD apparatus as an embodiment of a magnetic disk drive apparatus according to the present invention.

In the figure, reference numeral 10 denotes a housing of the HDD apparatus, 11 a magnetic disk driven by a spindle motor to rotate around a shaft 12, 13 a head assembly on which a slider 14 with a magnetic head element is mounted at its top end section, and 15 a support arm for supporting this head assembly 13 at its top end section, respectively.

At a rear end section of the support arm 15, mounted is a coil part of a voice coil motor (VCM). The arm 15 is capable of turning around a horizontal turning axis 16 in a plane parallel to a surface of the magnetic disk 11. The VCM is composed of the coil part and a magnet part 17 covering the coil part. The HDD apparatus has a ramp mechanism 18 disposed above a region from the outside of a data area of the disk 11 to the outside of the disk 11. A tab 21a, provided at the top end of the head assembly 13, runs onto an inclined surface of the ramp 18 so as to separate the slider 14 apart from the disk 11 to be in an unload state.

The slider 14 has a thin-film magnetic head 14a (FIG. 2) at its rear end surface or its trailing edge surface. The magnetic head 14a is composed of an inductive write head element and a magnetoresistive effect (MR) read head element such as a giant magnetoresistive effect (GMR) read head element or a tunnel magnetoresistive effect (TMR) read head element.

In operation or during high-speed rotation of the disk 15, the slider 14 flies with a low flying height opposing to the surface of the disk 11 to be in a load state. On the other hand, in non-operation or during stoppage of the rotation of the magnetic disk and during low-speed rotation of the magnetic disk for starting and stopping, the tab 21a provided at the top end of the head assembly 13 is located on the ramp mechanism 18, and accordingly the slider 14 is in the unload state.

Figure 2:
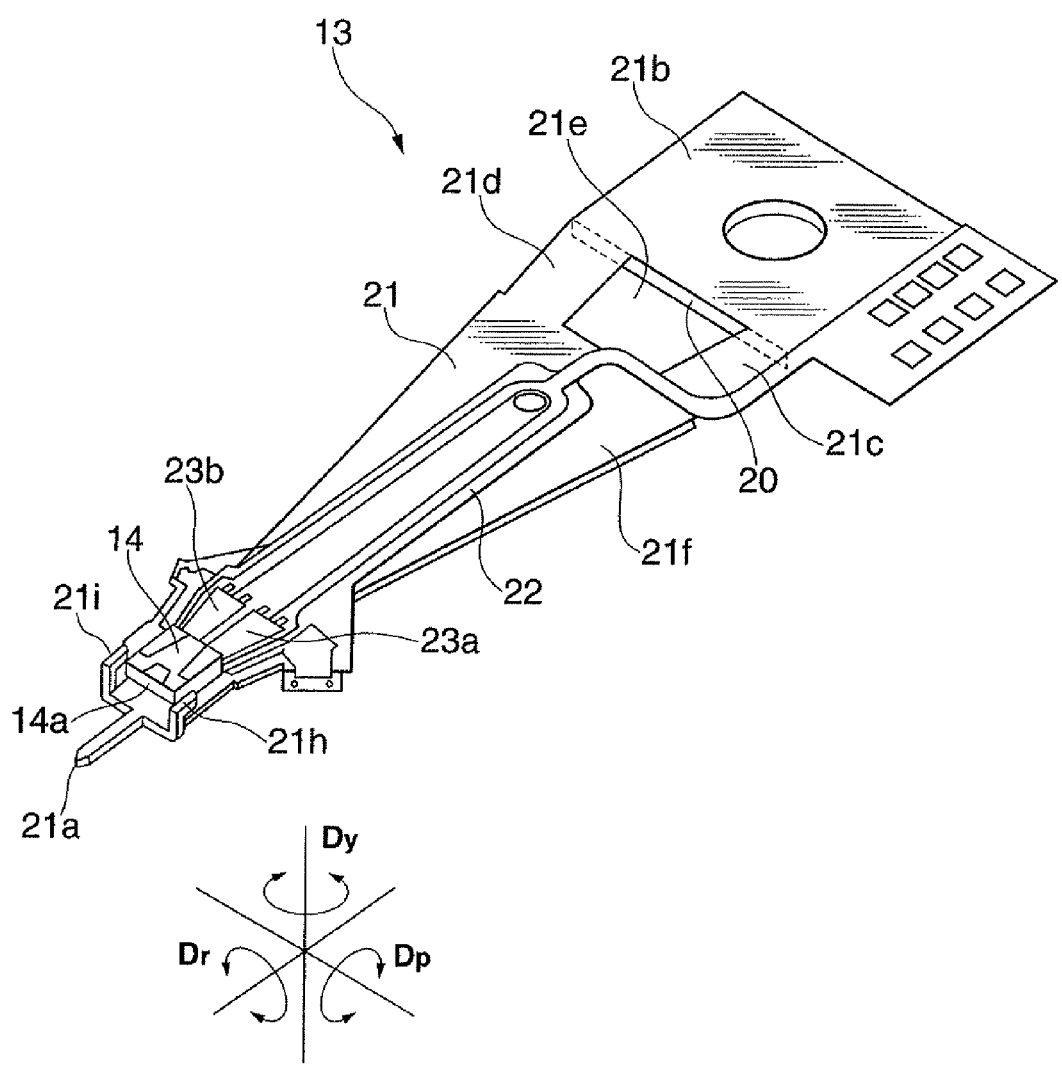
FIG. 2 is a perspective view schematically illustrating the overall structure of a head assembly in the embodiment of FIG. 1.
Figure 3:
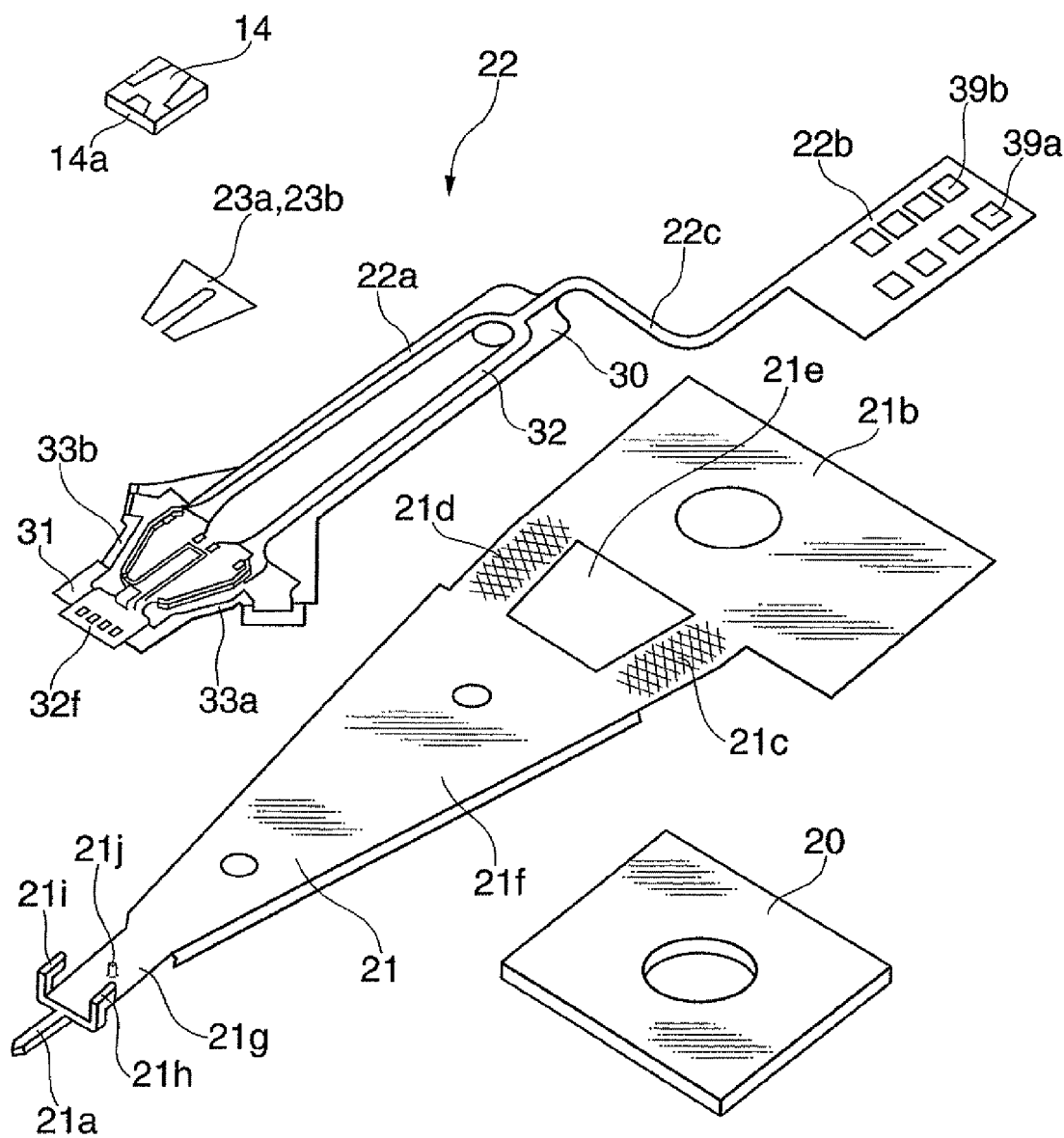
FIG. 3 is an exploded perspective view schematically illustrating in an exploded state of the overall structure of the head assembly in the embodiment of FIG. 1.

FIG. 2 schematically illustrates the overall structure of the head assembly in the embodiment of FIG. 1, and FIG. 3 schematically illustrates in an exploded state the overall structure of this head assembly.

As shown in these figures, the head assembly 13 includes, as its main structure elements, a base plate 20, a load beam 21, a flexure 22, first and second thin-film piezoelectric elements 23a and 23b as driving elements, and the slider 14 having the head element 14a.

The base plate 20 with a rectangular shape is configured to be attached to the top end section of the support arm 15 (FIG. 1). In FIG. 2, a pitching direction of the attitude angle of the slider 14 is indicated as a direction Dp, a rolling direction as a direction Dr, and a yawing direction as a direction Dy.

As shown in FIG. 3, the load beam 21 includes a base end section 21b fixed to the base plate 20 by, for example, beam welding, first and second plate spring sections 21c and 21d extending in a tapering shape from the base end section 21b, an opening section 21e formed between the first and second plate spring sections 21c and 21d, a beam main part 21f extending linearly in a tapering shape from and continuously formed with the first and second plate spring sections 21c and 21d, a top end support section 21g continuously formed with a top end of the beam main part 21f, and first and second regulation sections 21h and 21i rising from both right and left sides of the top end support section 21g.

A fulcrum protrusion 21j is integrally formed in a protruded shape nearly at the center of the top end support section 21g, and at the top end of the load beam 21, there is integrally formed the tab 21a extending in a direction apart from the base end section 21b. The first and second regulation sections 21h and 21i for regulating the movement of the flexure 22 are linearly extended from the top end of the top end support section 21g in a direction toward the base end section 21b.

The flexure 22 includes a flexure main part 22a fixed to the beam main part 21f of the load beam 21, a terminal part 22b for external connection terminals 39a and 39b, the terminal section 22b being fixed to the base end section 21b of the load beam 21, and a connection part 22c connecting the flexure main part 22a with the terminal section 22b in a crank shape. These flexure main part 22a, terminal part 22b and connection part 22c are formed integrally.

Figure 4:
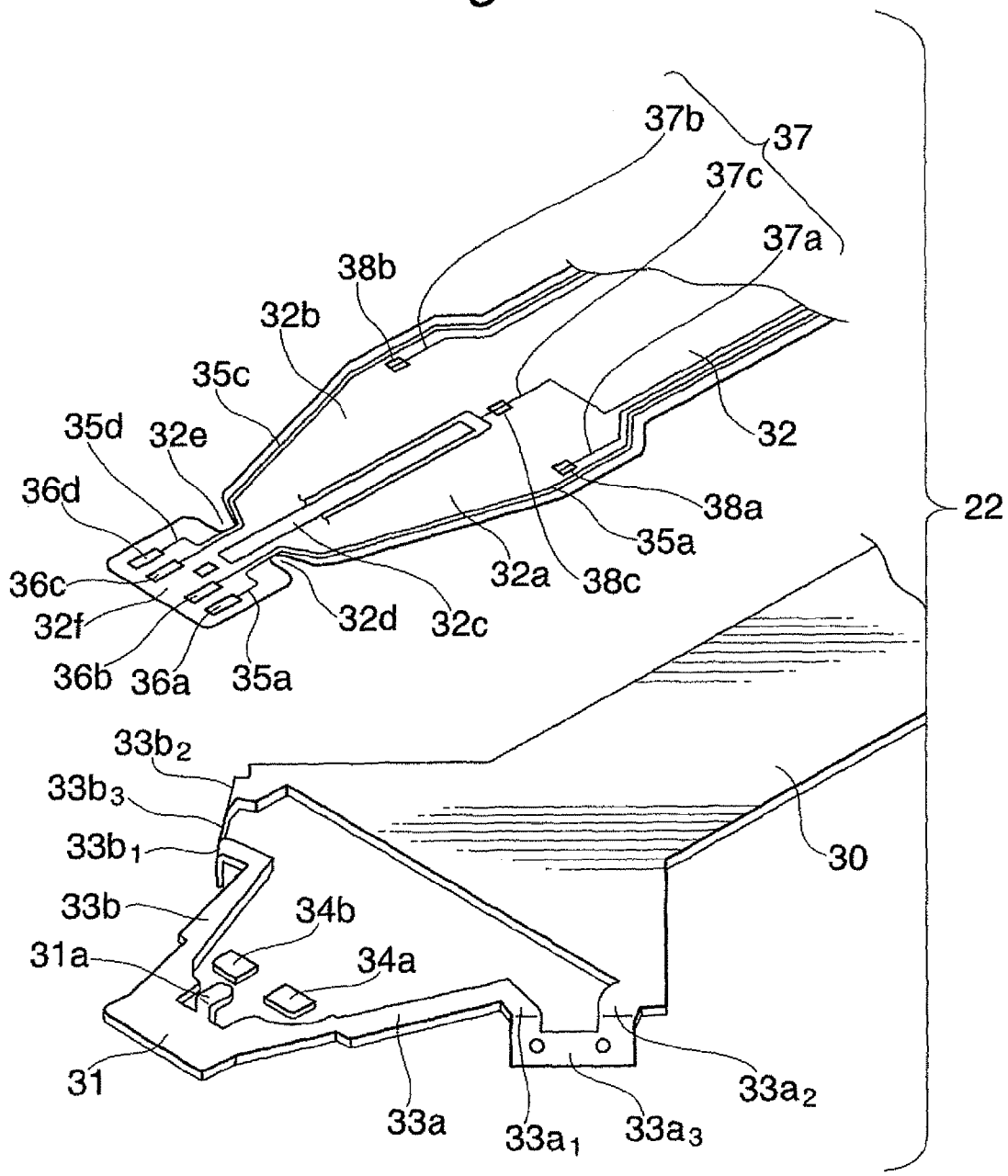
FIG. 4 is an exploded perspective view schematically illustrating in an exploded state concrete structure of a flexure in the embodiment of FIG. 1.
Figure 5:
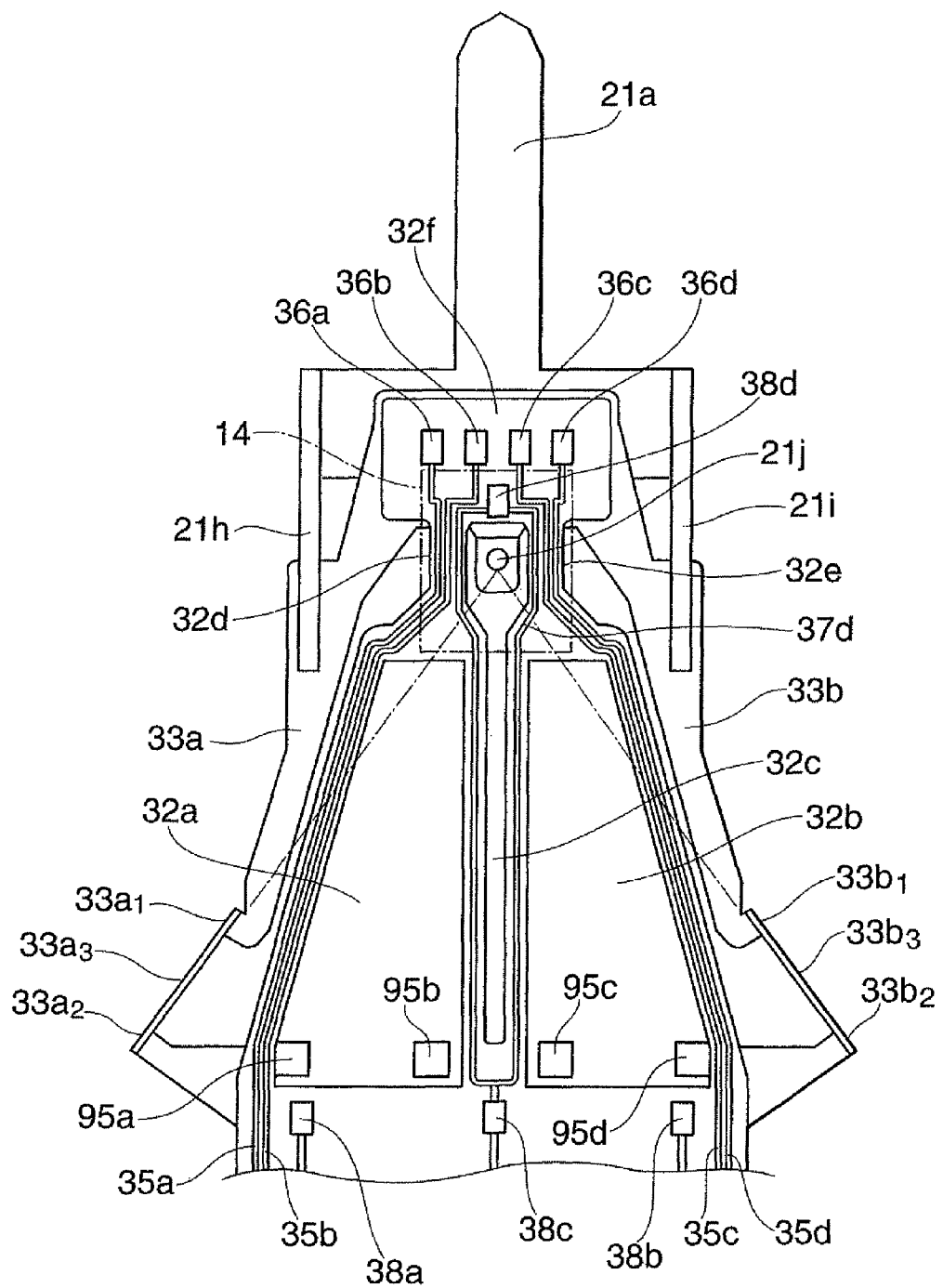
FIG. 5 is a plan view schematically illustrating structure of top end sections of a load beam and the flexure in the embodiment of FIG. 1.

FIG. 4 schematically illustrates in an exploded state the concrete structure of the flexure 22 (flexure main part 22a), and FIG. 5 schematically illustrates the structure of top end sections of the load beam 21 and the flexure 22.

As shown in FIG. 4, the flexure 22 (flexure main part 22a) includes in concrete terms a flexure substrate 30, a slider support plate 31 extending from a top end of the flexure substrate 30, and a wiring flexible substrate 32 with wiring, fixed on these flexure substrate 30 and slider support plate 31. The flexure substrate 30 and the slider support plate 31 are mutually formed integrally of a metal plate, preferably of a stainless steel plate.

From both sides of a rear end of the slider support plate 31, extended are a pair of first and second outrigger parts 33a and 33b arranged right-and-left symmetric to each other. These first and second outrigger parts 33a and 33b terminate at the flexure substrate 30. That is, these first and second outrigger parts 33a and 33b are integrally formed with the flexure substrate 30 and the slider support plate 31 by a metal plate, preferably a stainless steel plate.

These first and second outrigger parts 33a and 33b regulate the attitude angle of the slider support plate 31 in the rolling direction and the pitching direction, and also play the role of pushing the slider support plate 31 against the fulcrum protrusion 21j formed at the top end section of the load beam 21. In the middle of the first and second outrigger parts 33a and 33b, formed are as their parts a first link part $33a_3$ in a linear shape and a second link part $33b_3$ in a linear shape, respectively. The first link part $33a_3$ has a first top-end joint part $33a_1$ and a first base-end joint part $33a_2$ at its both ends, and the second link part $33b_3$ has a second top-end joint part $33b_1$ and a second base-end joint part $33b_2$ at its both ends. The first link part $33a_3$ and the second link part $33b_3$ are formed by bending at a right angle a part of respective metal plates constituting the first and second outrigger parts 33a and 33b.

As described above, the slider support plate 31 is connected to the flexure substrate 30 through not only the first and second outrigger parts 33a and 33b but also through the wiring flexible substrate 32.

As shown in FIG. 5, the wiring flexible substrate 32 has first and second piezoelectric-body support sections 32a and 32b for supporting the first and second thin-film piezoelectric elements 23a and 23b, respectively. A slit 32c is formed between these first and second piezoelectric-body support sections 32a and 32b. At the top end section of the wiring flexible substrate 32, at which the wiring flexible substrate 32 is connected to the slider support plate 31, formed are first and second elastic hinge sections 32d and 32e. Each of these first and second elastic hinge sections 32d and 32e is formed to have a local narrow and thin-width part, and connected to the flexure top end section 32f. The slider support plate 31 is integrally fixed to the flexure top end section 32f. Since the first and second elastic hinge sections 32d and 32e are formed slim, the slider support plate 31 can turn in a plane of its surface. Between the first and second elastic hinge sections 32d and 32e and the bi-forked first and second piezoelectric-body support sections 32a and 32b, attached are connection plates 34a and 34b for reinforcement, respectively (FIG. 4).

The flexure substrate 30, the slider support plate 31, the first and second outrigger parts 33a and 33b, the first and second link parts $33a_3$ and $33b_3$, and the reinforcement connection plates 34a and 34b are formed of metal plate members, preferably of stainless steel members. The first and second elastic hinge sections 32d and 32e and the wiring flexible substrate 32 are composed of an insulation film made of, for example, polyimide resin, and wiring material. On the wiring flexible substrate 32, a wiring pattern for head elements and a wiring pattern for thin-film piezoelectric elements are formed by patterning. The polyimide resin functions as an insulation film commonly to the wiring pattern for thin-film piezoelectric elements and the wiring pattern for head elements.

The wiring pattern for thin-film piezoelectric elements includes a first thin-film piezoelectric element driving wiring 37a, a second thin-film piezoelectric element driving wiring 37b, and a third thin-film piezoelectric element driving wiring 37c. Other than this, a ground wiring 37d (FIG. 5) is formed.

As shown in FIG. 5, the wiring pattern for head elements includes first and second head-element wirings 35a and 35b patterned along the left side, and third and fourth head-element wirings 35c and 35d patterned along the right side. These wirings are extended to the flexure top end section 32f, and connected to lands 36a, 36b, 36c and 36d, respectively.

A land 38c of the third thin-film piezoelectric element driving wiring 37c is arranged near the base-side end of the slit 32c, and a land 38a of the first thin-film piezoelectric element driving wiring 37a and a land 38b of the second thin-film piezoelectric element driving wiring 37b are arranged at both left-and-right sides of the land 38c. A land 38d of the ground wiring 37d is arranged near the top-side end of the slit 32c, and the ground wiring is wired from the land 38d through both sides of the slit 32c and connected to the land 38c of the third thin-film piezoelectric element driving wiring 37c.

The first elastic hinge section 32d is composed of the first head-element wiring 35a, the second head-element wiring 35b and an insulation film of the flexible substrate 32. The second elastic hinge section 32e is composed of the ground wiring 37d, the third head-element wiring 35c, the fourth head-element wiring 35d and an insulation film of the flexible substrate 32.

The flexure 22 mainly including the flexure substrate 30, the slider support plate 31, the wiring flexible substrate 32, and the reinforcement connection plates 34a and 34b is fabricated by etching the stainless steel plate used for the flexure substrate 30 and the slider support plate 31 under the state that the wiring pattern for thin-film piezoelectric elements and the wiring pattern for head elements are stacked and coated on the surface. Then, executed is a trimming process by etching to the stainless steel plate with such wiring patterns, so as to form the flexure substrate 30, the slider support plate 31 and the reinforcement connection plates 34a and 34b. Thus, a state where the flexure substrate 30 is coupled to the slider support plate 31 through the wiring flexible substrate 32 can be obtained. Therefore, the slider support plate 31 gets coupled to the flexure substrate 30 in a freely movable state through the first and second elastic hinge sections 32d and 32e of the wiring flexible substrate 32, whereby the slider support plate 31 and the flexure top end section 32f have flexibility with respect to the movement of the slider 14 in the pitching direction and the rolling direction. Here, the pitching direction corresponds to the Dp direction of FIG. 2, and the rolling direction to the Dr direction of FIG. 2.

Figure 6:
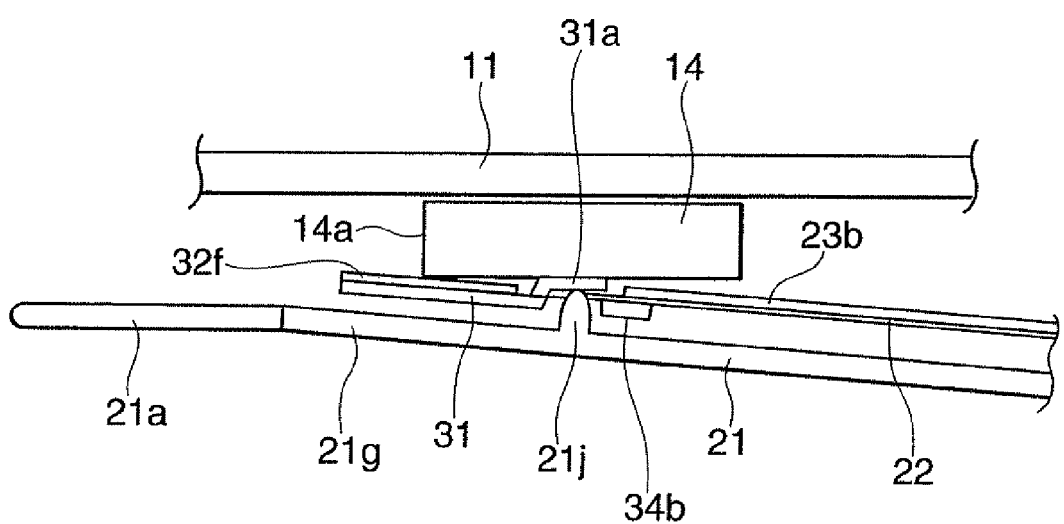
FIG. 6 is a side view schematically illustrating the structure of the top end sections of the load beam and the flexure in the embodiment of FIG. 1.

FIG. 6 schematically illustrates the structure of the top end sections of the load beam 21 and the flexure 22 in the embodiment of FIG. 1.

As shown in FIGS. 6 and 4, the slider support plate 31 has flexibility to the flexure substrate 30 and has at its center a slider-holding section 31a integrally formed by step-bending work. The slider-holding section 31a thus formed protrudes from a reference surface of the slider support plate 31 to its normal-line direction. The shape of the slider support plate 31 is determined so that an inertial axis of a slider turning part, which is a combination of the slider 14, the flexure top end section 32f and the slider support plate 31, coincides with the fulcrum protrusion 21j.

Figure 7:
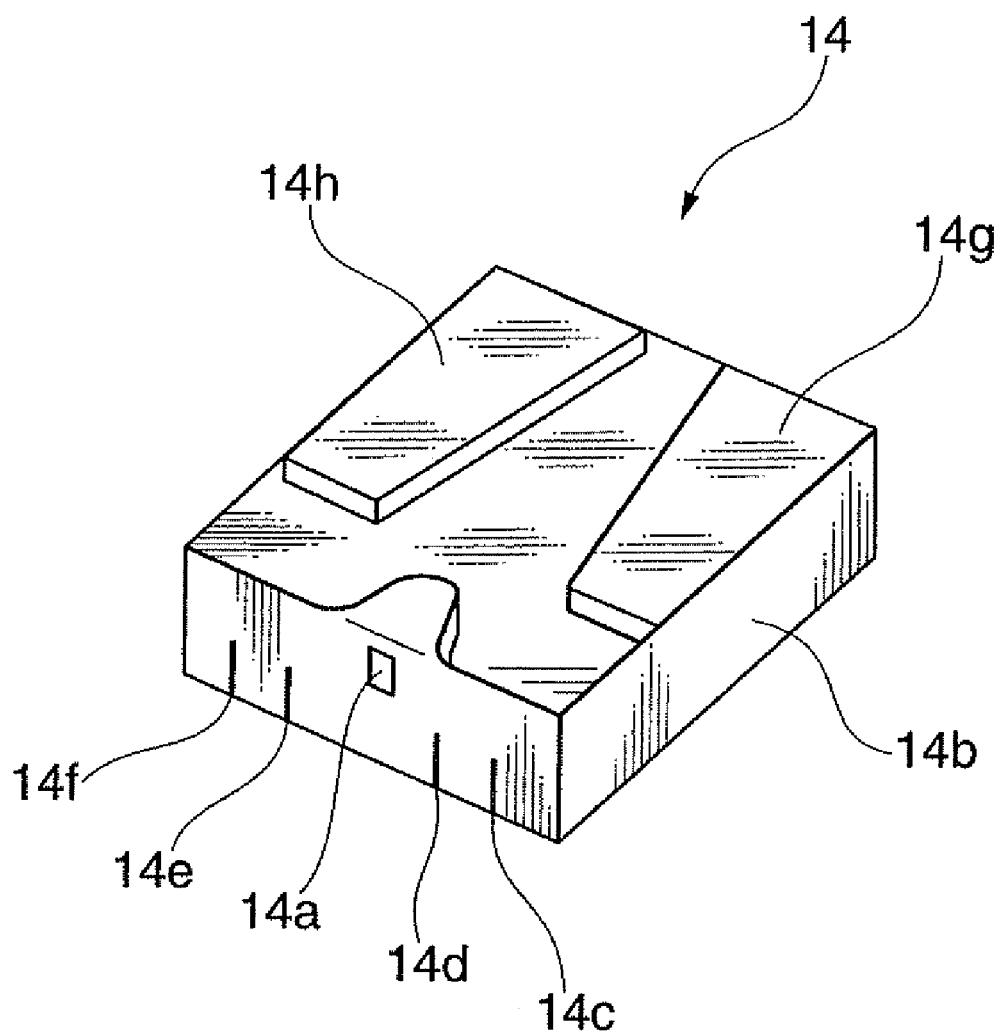
FIG. 7 is a perspective view schematically illustrating structure of a slider in the embodiment of FIG. 1.

FIG. 7 illustrates the structure of the slider 14. As shown in this figure, the slider 14 has a head element 14a mounted on a slider main body 14b made of ceramic. The head element 14a may be a magnetoresistive effect (MR) read head element and an inductive write head element. Four electrode terminals 14c, 14d, 14e and 14f connected to the head element 14a are mainly embedded in the slider main body 14b but a part of these terminals are exposed on an element-formed surface in an aligned arrangement. An upper surface of the slider main body 14b constitutes air bearing surfaces 14g and 14h for air flow generated by the rotationally driven magnetic disk 11. The air bearing surfaces 14g and 14h cause the air flow to flow along the pitching direction of the slider 14 or a tangent direction of the magnetic disk 11 to form an air lubrication layer between the slider 14 and the magnetic disk 11.

Figure 8:
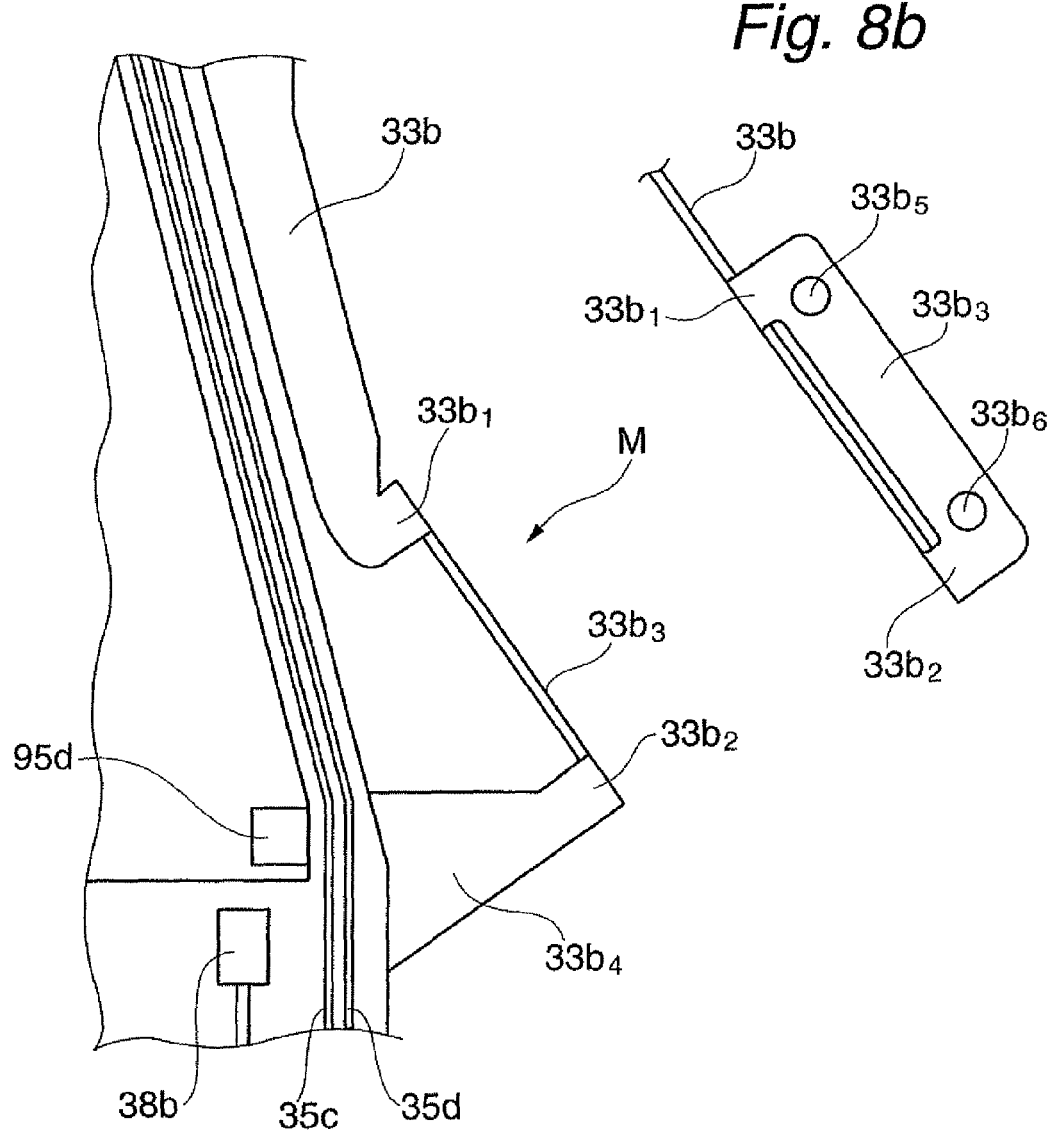
FIG. 8a is an enlarged plan view illustrating structure of a link part in the embodiment of FIG. 1.
FIG. 8b is an enlarged side view illustrating the structure of the link part in the embodiment of FIG. 1.

FIGS. 8a and 8b illustrate enlarged structure of the second link part $33b_3$ in the second outrigger part 33b in the embodiment of FIG. 1, where FIG. 8a is a plan view and FIG. 8b is a side view seen from a direction of an arrow M.

As is understood from FIGS. 8a, 8b, 4 and 5, the first and second outrigger parts 33a and 33b for coupling the slider support plate 31 and the flexure substrate 30 to each other are integrated with the flexure substrate 30, and shaped by a processing method such as etching. Each of the first and second link parts $33a_3$ and $33b_3$ is thereafter bent by bending work at a right angle to a surface of the flexure substrate 30 opposite to the other surface to which the first and second thin-film piezoelectric elements 23a and 23b are fixed. Each of the first and second link parts $33a_3$ and $33b_3$ is formed linearly. The bending-worked sections at both ends of the first link part $33a_3$ constitute the first top-end joint part $33a_1$ and the first base-end joint part $33a_2$ that are swing fulcrums, respectively. Also, the bending-worked sections at both ends of the second link part $33b_3$ constitute the second top-end joint part $33b_1$ and the second base-end joint part $33b_2$ that are swing fulcrums, respectively. As shown in FIG. 8b, in the vicinities of both ends of the second link part $33b_3$, formed by etching in advance are through holes $33b_5$ and $33b_6$ so as to facilitate the bending work. Although not shown, similar through holes are formed in the first link part $33a_3$.

Next, a description will be given of concrete structure of the first and second thin-film piezoelectric elements 23a and 23b.

Figure 9:
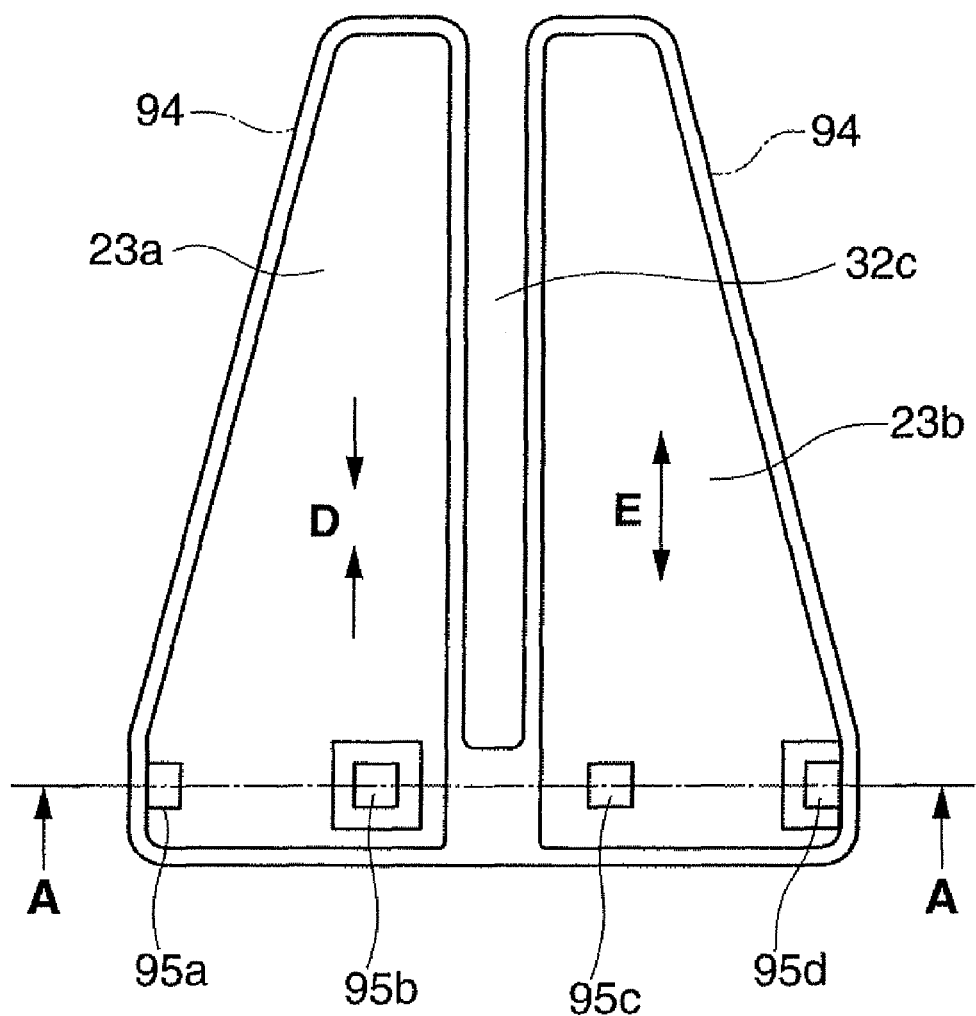
FIG. 9 is a plan view illustrating structure of first and second thin-film piezoelectric elements in the embodiment of FIG. 1.
Figure 10:
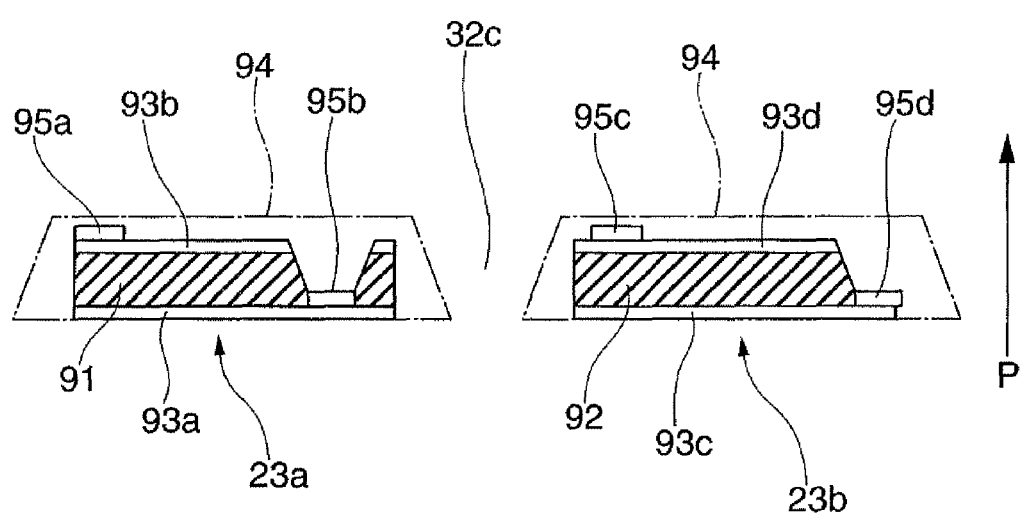
FIG. 10 is a cross-sectional view illustrating section A-A shown in FIG. 9.

FIG. 9 illustrates the structure of first and second thin-film piezoelectric elements 23a and 23b as a plan view, and FIG. 10 illustrates a cross-sectional view taken on the line A-A. For the sake of clarity, FIG. 10 is depicted on a scale larger than actual scale in a thickness direction.

The first and second thin-film piezoelectric elements 23a and 23b are configured as a bi-forked shape with the slit 32c sandwiched there between, and connected to each other only at their base. These first and second thin-film piezoelectric elements 23a and 23b are arranged on the first and second piezoelectric-body support sections 32a and 32b of the wiring flexible substrate 32, respectively, and covered by a coating resin layer 94. In modification, these first and second thin-film piezoelectric elements 23a and 23b may be separated apart to right and left.

As is apparent from FIG. 10, the first and second thin-film piezoelectric elements 23a and 23b basically have the same structure each other. That is, electrodes 93b and 93a are stacked on the upper surface and the lower surface of a thin-film piezoelectric body 91 of the first thin-film piezoelectric element 23a, respectively, and similarly electrodes 93d and 93c are stacked on the upper surface and the lower surface of a thin-film piezoelectric body 92 of the second thin-film piezoelectric element 23b, respectively. Provided are a connection pad 95b for applying a voltage to the electrode 93a, a connection pad 95a for grounding the electrode 93b, a connection pad 95c for applying a voltage to the electrode 93d, and a connection pad 95d for grounding the electrode 93c.

A piezoelectric material is used for the thin-film piezoelectric bodies 91 and 92. It is particularly desired to use a piezoelectric material with a perovskite structure. For example, a simple perovskite as in a lead-based perovskite such as PZT (lead zirconate titanate), and a complex perovskite including a layered perovskite such as $Bi_4Ti_3O_{12}$ and the like may be used. When forming a film of thin-film piezoelectric body, it is desired at first to form a seed film to more improve the orientation. As the seed film, although it is not limited, using of a seed film with a perovskite structure is desired. Any seed film, which functions as piezoelectric material such as, for example PLT (lanthanum-doped lead titanate), $PbTiO_3$ (lead titanate) or SrRuO3, or does not function as piezoelectric material can be used.

As a material of the electrodes 93a-93d, a conductive material is used. It is particularly desired to include, as its main component, at least one component selected from a group of Au and platinum-group elements (Pt, Ir, Pd, Os, Ru and Rh). More desirably, the electrodes are made of these metals or an alloy containing these metals. The electrodes may be formed from two or more kinds of thin films made of different components, respectively.

The polarization direction of the thin-film piezoelectric bodies 91 and 92 is a direction indicated by an arrow P in FIG. 10. When a plus voltage is applied to the connection pad 95b, the thin-film piezoelectric body 91 contracts in a $d_{31}$ direction (a direction indicated by an arrow D in FIG. 9), and when a plus voltage is applied to the connection pad 95c, the thin-film piezoelectric body 92 expands in the $d_{31}$ direction (a direction indicated by an arrow E in FIG. 9).

As shown in FIG. 5, the connection pad 95a is connected to the land 38a of the wiring 37a for driving piezoelectric element formed on the flexure 22, and the connection pad 95d is connected to the land 38b of the wiring 37b for driving piezoelectric element formed on the flexure 22, by means of wire-bonding or the like. The connection pads 95b and 95c are grounded at the land 38c of the wiring 37c for driving piezoelectric element.

Next, a process for attaching the slider 14 to the flexure 22 will be described with reference to FIG. 6.

The flexure top-end section 32f located at the top end section of the flexure 22 is integrally fixed to the slider support plate 31, and the slider 14 is attached to this section. In other words, under the state that the geometric center or centroid of the slider 14 is in contact with the bending-worked slider-holding section 31a, the front end and lower edge of the slider 14 is made to contact with and adhered to a plane section of the slider support plate 31 so that the slider 14 and the slider support plate 31 are integrally fixed to each other at the contacting place. By adjusting a step amount of the slider-holding section 31a formed with step-bending work, an inclination angle of the slider 14 in the pitching direction can be freely set.

As shown in FIGS. 5 and 7, the lands 36a, 36b, 36c and 36d at the end of the head element wirings 35a, 35b, 35c and 35d are electrically and physically connected to the electrode terminals 14c, 14d, 14e and 14f that are electrically inner-connected to the head element 14a in the slider 14, via conductive adhesive and the like.

As shown in FIG. 5, on their ways of the first and second outrigger parts 33a and 33b, the first link part $33a_3$ having the first top-end joint part $33a_1$ and the first base-end joint part $33a_2$ at both ends, and the second link part $33b_3$ having the second top-end joint part $33b_1$ and the second base-end joint part $33b_2$ at both ends are formed as their parts, respectively. The first link part $33a_3$ and the second link part $33b_3$ are formed by bending a part of the metal plate, constituting the first and second outrigger parts 33a and 33b, at a right angle. The first top-end joint part $33a_1$ and the first base-end joint part $33a_2$ as well as the second top-end joint part $33b_1$ and the second base-end joint part $33b_2$, each of which constitutes a bent part with a right angle, act as flexible joints.

Particularly, in this embodiment, an extended line of the first link part $33a_3$ and an extended line of the second link part $33b_3$ travel toward a position of the fulcrum protrusion 21j that supports the slider 14 to freely turn, and intersect with each other. More specifically, it is configured that the point of intersection of the extended lines of the first link part $33a_3$ and the second link part $33b_3$ lies at the position of the fulcrum protrusion 21j. With this structure, an instantaneous center of the slider support plate 31 lies at the fulcrum protrusion 21j. As a result, when the slider support plate 31 turns around the fulcrum protrusion 21j, only a bending load acts on the first link part $33a_3$ and the second link part $33b_3$ but a tensile load hardly acts on them.

Thus, the slider support plate 31 of this embodiment is supported by the first and second elastic hinge sections 32d and 32e and by the first and second outrigger parts 33a and 33b with link mechanisms. The first and second elastic hinge sections 32d and 32e have flexibility in the rolling direction and the pitching direction of the slider 14, and have high rigidity in the yawing direction. On the other hand, the first and second outrigger parts 33a and 33b with link mechanisms have appropriate rigidity in the rolling direction and the pitching direction of the slider 14, and have high flexibility in the yawing direction. The attitude angle (in the pitching directions and the rolling direction) of the slider 14 is adjusted by the first and second outrigger parts 33a and 33b. Moreover, these first and second outrigger parts 33a and 33b function for applying an internal force or a preload to the fulcrum protrusion 21j from the slider support plate 31. That is, this structure makes it difficult for the slider support plate to separate apart from the fulcrum protrusion at the time of loading/unloading operation. This allows keeping the attitude angle of the slider constant, and avoiding collision of the slider against the disk.

Figure 12A:
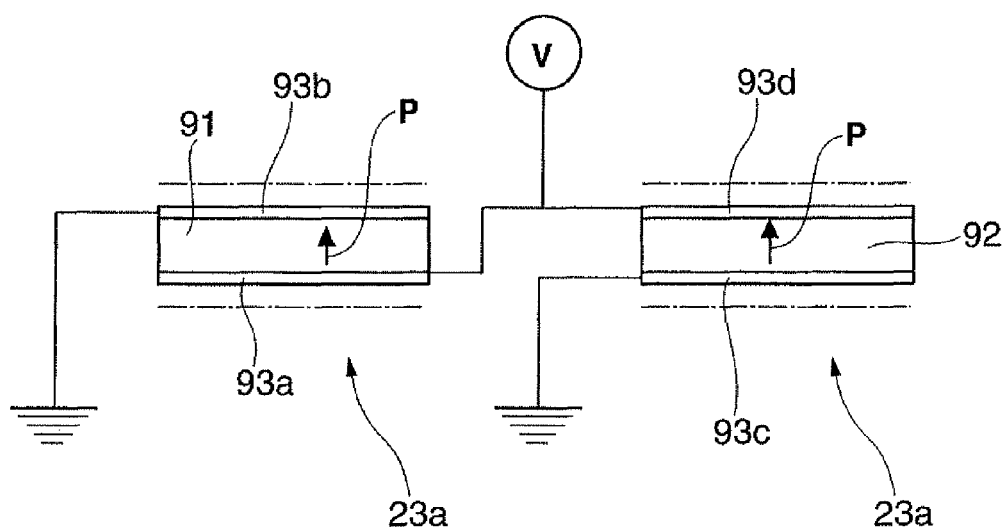
FIG. 12a is a diagram illustrating operation of the thin-film piezoelectric elements in the embodiment of FIG. 1.
Figure 12B:
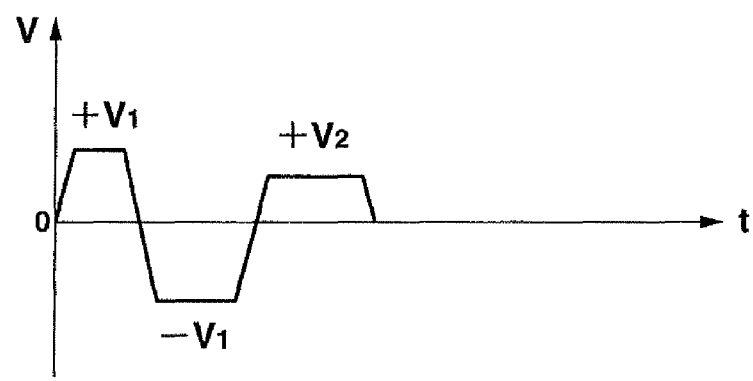
Figure 13A:
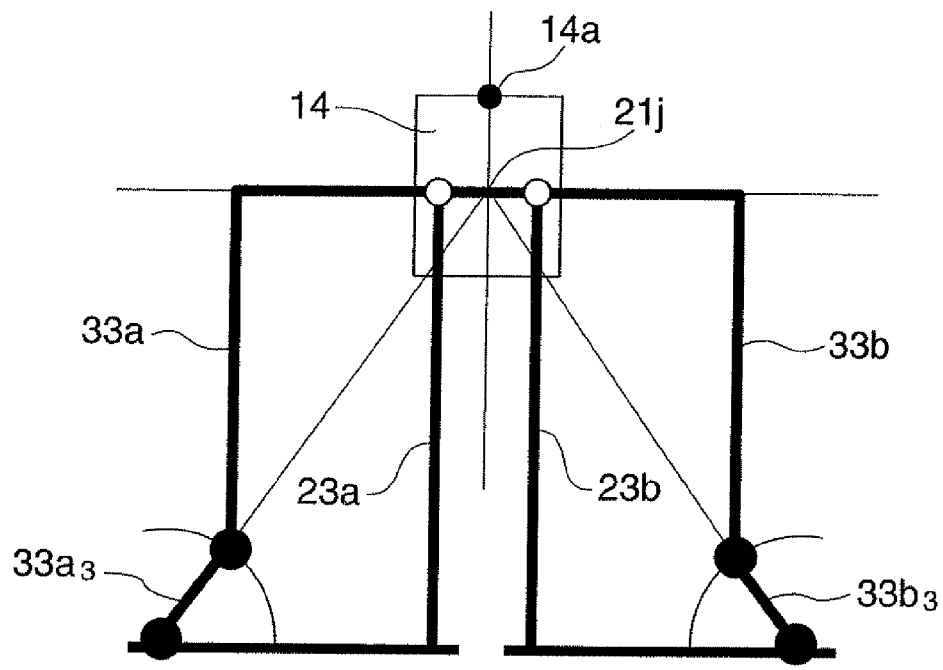
FIG. 13a is a diagram illustrating operation of the link part and the joint part in the embodiment of FIG. 1.
Figure 13B:
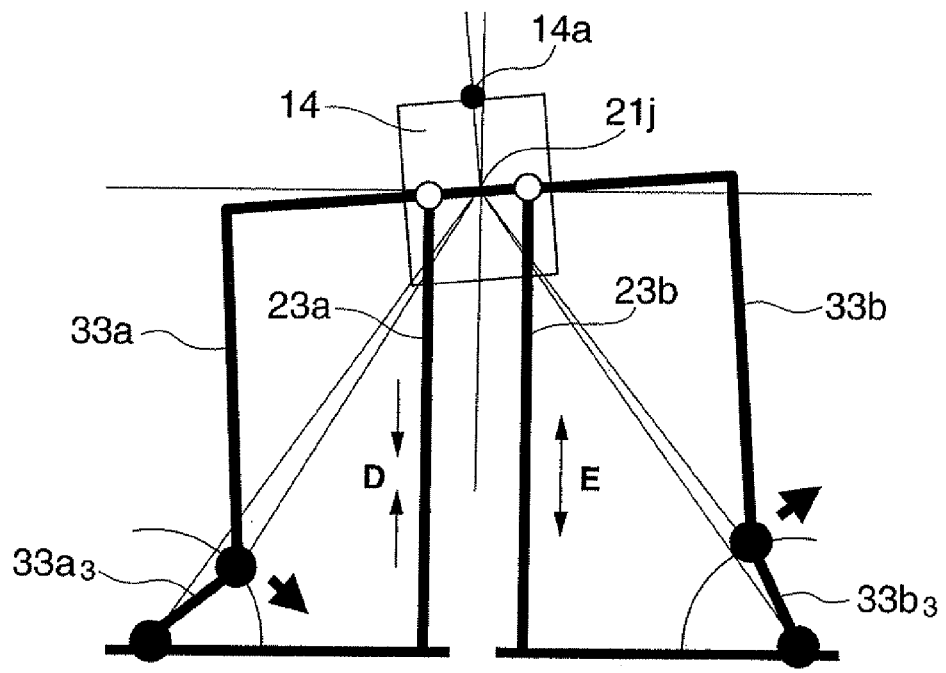
FIG. 13b is a diagram illustrating the operation of the link part and the joint part in the embodiment of FIG. 1.

FIG. 11a schematically illustrates configurations of the link part and the joint part in the embodiment of FIG. 1, and FIG. 11b illustrates operation of the link part and the joint part in the embodiment of FIG. 1. FIG. 12a illustrates operation of the thin-film piezoelectric elements in the embodiment of FIG. 1, and FIG. 12b illustrates a waveform diagram of a drive voltage applied to the thin-film piezoelectric elements of FIG. 12a. FIG. 13a illustrates operation of the link part and the joint part in the embodiment of FIG. 1, and FIG. 13b illustrates the operation of the link part and the joint part in the embodiment of FIG. 1. FIGS. 14a, 14b, 15a and 15b illustrate operations of a link part and a joint part in a conventional art. Hereinafter, operation of the head assembly of this embodiment will be described in more detail with reference to these drawings.

As shown in FIGS. 11a and 11b, in this embodiment, a link mechanism is configured by the first and second outrigger parts 33a and 33b, those base parts $33a_4$ and $33b_4$, and the first and second link parts $33a_3$ and $33b_3$. Moreover, the mechanism is configured such that the point of intersection of the extended line of the first link part $33a_3$ and the extended line of the second link part $33b_3$ lie at the position of the fulcrum protrusion 21j, and the instantaneous center of the slider support plate 31 lies at the fulcrum protrusion 21j. In this case, the first and second elastic hinge sections 32d and 32e correspond to swing fulcrums, and the first and second thin-film piezoelectric elements 23a and 23b correspond to beams.

As shown in FIG. 12a, in the first and second thin-film piezoelectric elements 23a and 23b, the electrodes 93b and 93c of the thin-film electric bodies 91 and 92 are grounded, and a voltage shown in FIG. 12b is applied to the electrodes 93a and 93d. If the polarization direction of the thin-film electric bodies 91 and 92 is presented by an arrow P, the first and second thin-film piezoelectric elements 23a and 23b contract and expand in the directions shown by arrows D and E in FIG. 9 depending upon the piezoelectric constant $d_{31}$, respectively.

FIG. 13a indicates a state where no voltage is applied to the electrodes 93a and 93d. When a plus voltage $V_1$ is applied to the electrodes 93a and 93d, the first piezoelectric element 23a contracts as shown in FIG. 13b and the second piezoelectric element 23b expands, whereby the slider 14 turns around the fulcrum protrusion 21j. The slider support plate 31 is linked with the flexure substrate 30 by means of the first and second outrigger parts 33a and 33b provided with the link mechanism including the first and second link parts $33a_3$ and $33b_3$. Since the point of intersection of the extended lines of the first and second link parts $33a_3$ and $33b_3$ lies at the position of the fulcrum protrusion 21j, the instantaneous center of turning movement of the slider support plate 31 also lies at the position of the fulcrum protrusion 21j. In case that an effective length of the first and second thin-film piezoelectric elements 23a and 23b is, for example, 2 mm, a displacement amount of the head element 14a is very small such as 0.5 μm or less at most. Therefore, the displacement between the instantaneous center of the slider support plate 31 and the fulcrum protrusion 21*j* is negligible. Accordingly, a mechanical load of the turning movement of the slider support plate 31, caused by driving of the first and second thin-film piezoelectric elements 23*a* and 23*b* becomes extremely small.

Figure 14A:
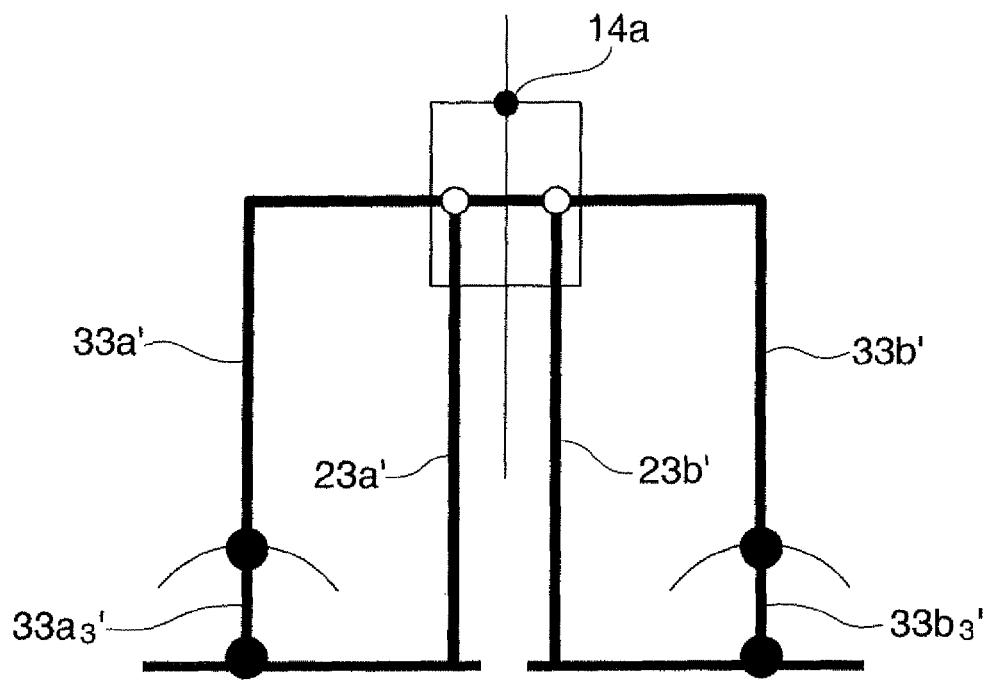
FIG. 14a is a diagram illustrating operation of a link part and a joint part in a conventional art.
Figure 14B:
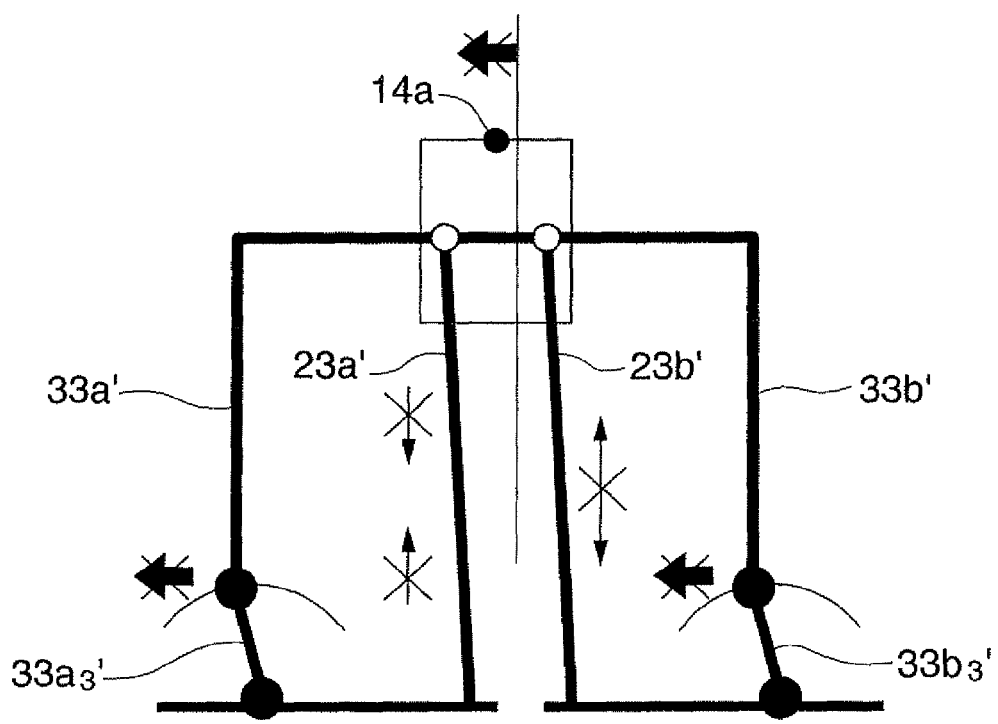
FIG. 14b is a diagram illustrating the operation of the link part and the joint part in the conventional art.

For better understanding, FIGS. 14*a* and 14*b* illustrate a comparison (conventional art) example in which first and second link parts 33*a*$_3$' and 33*b*$_3$' of first and second outrigger parts 33*a*' and 33*b*' form a link in parallel with each other. In this example, since a link mechanism is formed as a parallel link, first and second thin-film piezoelectric elements 23*a*' and 23*b*' have no flexibility in contracting and expanding, and therefore no movement of the head element 14*a* can be allowed (in the figure, a mark × indicates no motion').

Figure 15A:
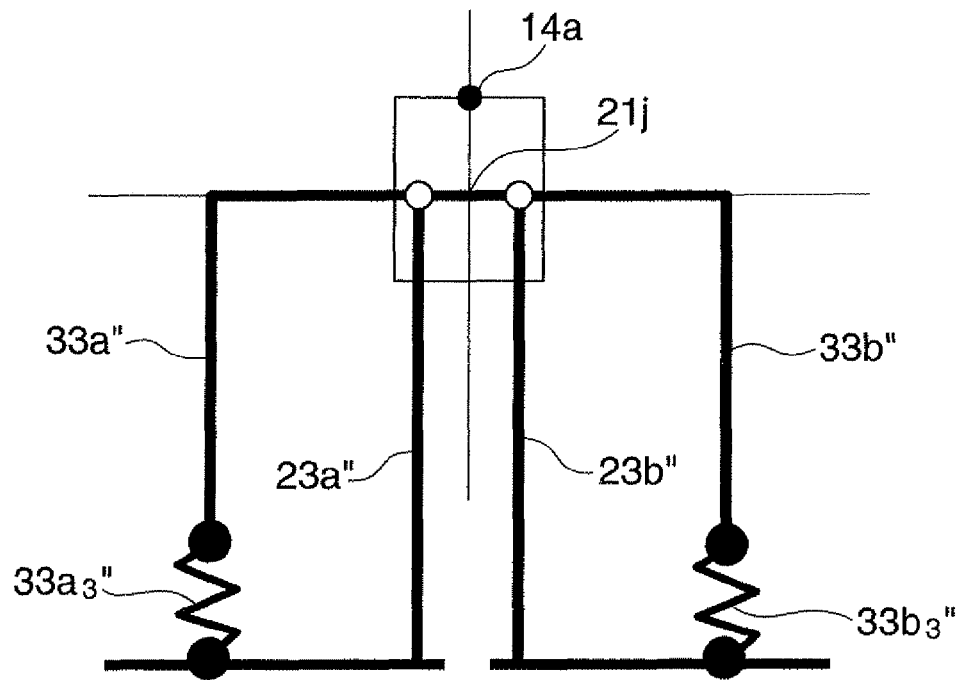
FIG. 15a is a diagram illustrating the operation of the link part and the joint part in a conventional art.
Figure 15B:
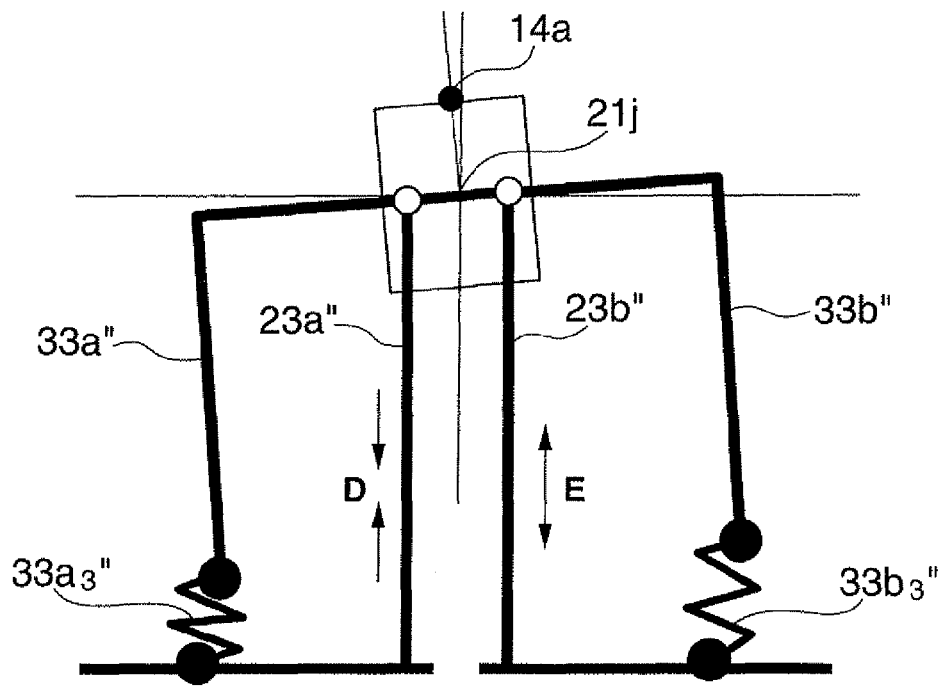
FIG. 15b is a diagram illustrating the operation of the link part and the joint part in the conventional art.

FIGS. 15*a* and 15*b* illustrate a structure in another (conventional art) example in which the parallel link of FIGS. 14*a* and 14*b* has spring properties. In other words, the slider support plate 31 is coupled to the flexure substrate 30 through first and second link parts 33*a*$_3$" and 33*b*$_3$" with spring properties in first and second outrigger parts 33*a*" and 33*b*". In this example, first and second thin-film piezoelectric elements 23*a*" and 23*b*" turn around the position of the fulcrum protrusion 21*j*, but large energy is required for contracting and expanding the first and second link parts 33*a*$_3$" and 33*b*$_3$" with spring properties, resulting in a reduced movement amount of the head element 14*a*. Therefore, it is difficult to secure necessary performance by using the structures shown in FIGS. 14*a* and 14*b* and FIGS. 15*a* and 15*b*.

Whereas according to the embodiment of the present invention, the first link part 33*a*$_3$ and the second link part 33*b*$_3$, formed on their way of the first and second outrigger parts 33*a* and 33*b*, are formed by bending a part of the metal plate for the first and second outrigger parts 33*a* and 33*b*, at a right angle to a direction of the flexure substrate 30 opposite to its surface to which the first and second thin-film piezoelectric elements 23*a* and 23*b* are fixed. Since the bending direction is set as in this opposite direction, unnecessary vibration caused by resonance at a specific frequency can be prevented. Hereinafter, this fact will be described in detail.

Figure 16A:
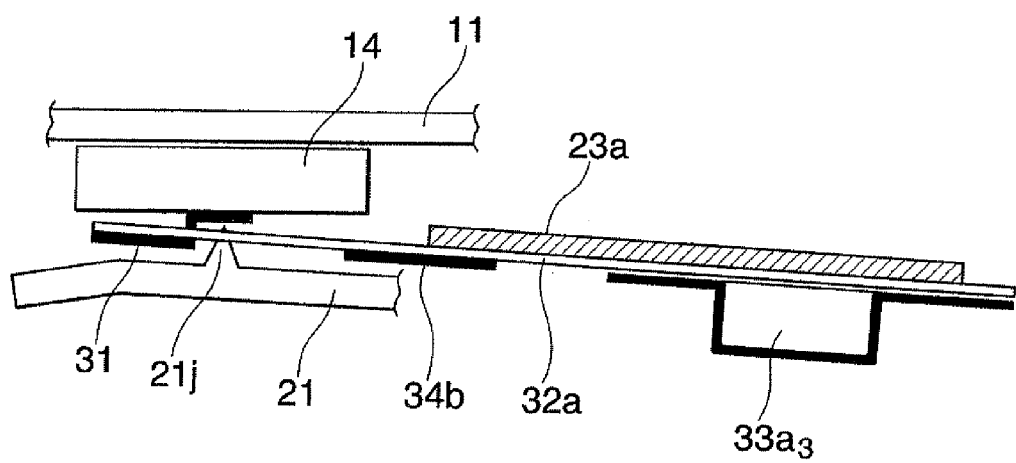
FIG. 16a is a side view schematically illustrating movement of the head assembly having the first and second link parts that are formed bent as in the embodiment of FIG. 1.
Figure 16B:
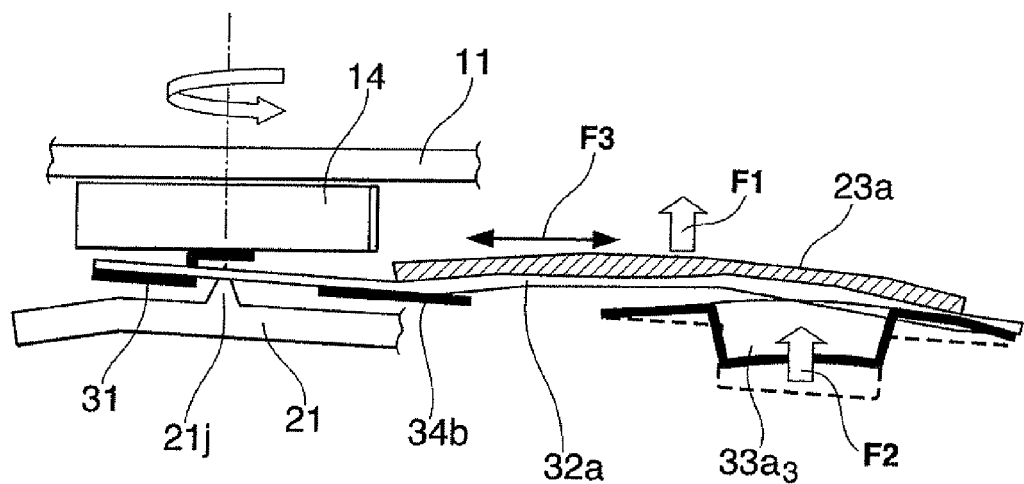
FIG. 16b is a side view schematically illustrating the movement of the head assembly having the first and second link parts that are formed bent as in the embodiment of FIG. 1.
Figure 17A:
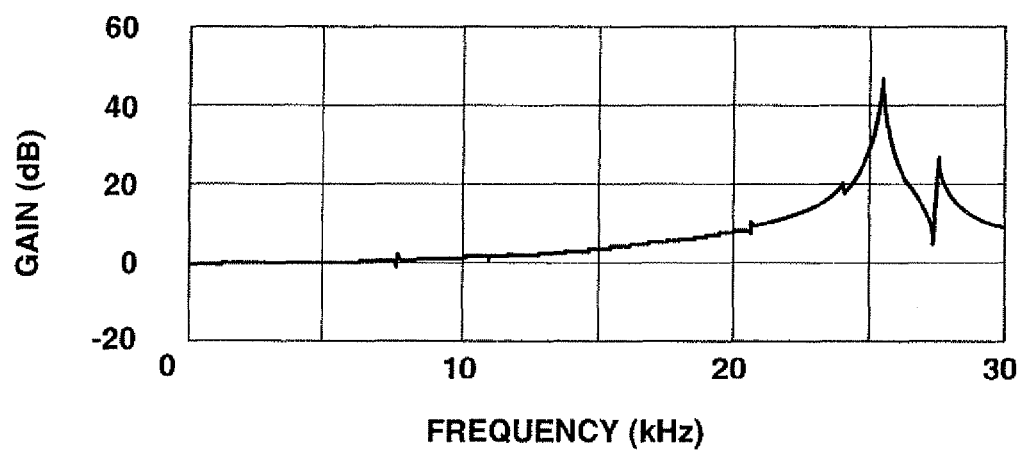
FIG. 17a is a characteristic diagram illustrating gain to frequency change when the first and second link sections have the structure of FIGS. 16a and 16b.
Figure 17B:
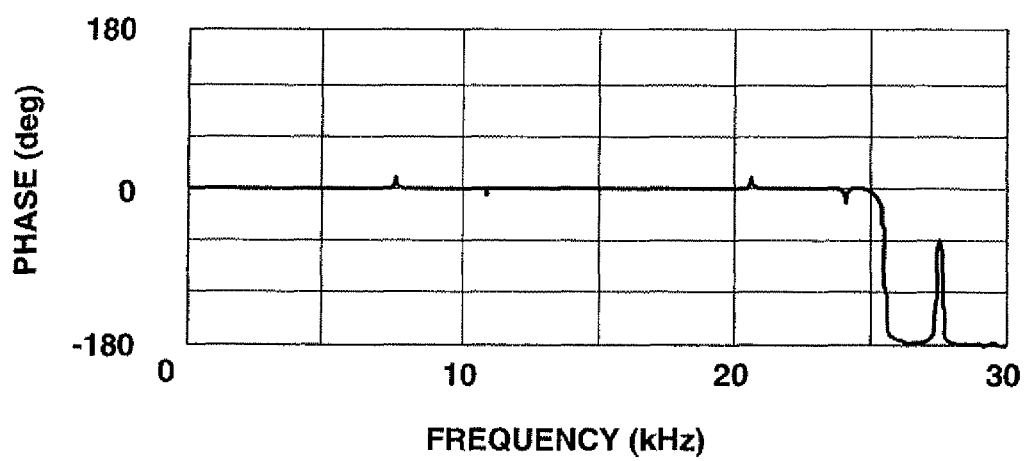
FIG. 17b is a characteristic diagram illustrating phase to frequency change when the first and second link sections have the structure of FIGS. 16a and 16b.
Figure 18A:
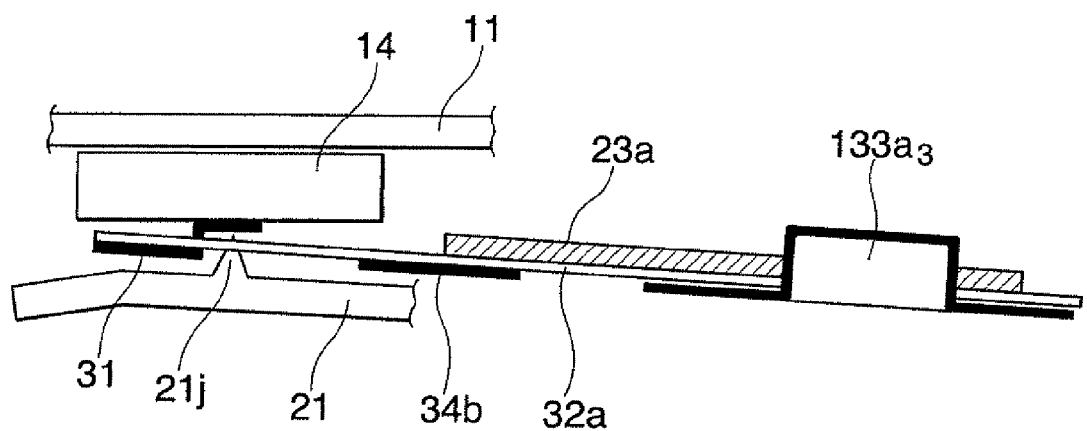
FIG. 18a is a side view schematically illustrating the movement of the head assembly having the first and second link parts that are formed bent in a reverse direction contrary to that in the embodiment of FIG. 1.
Figure 18B:
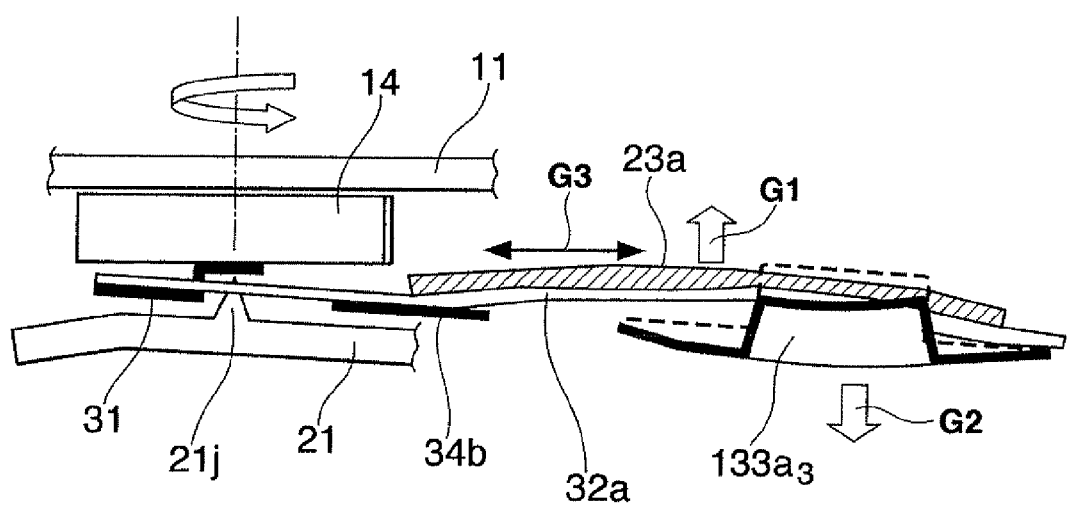
FIG. 18b is a side view schematically illustrating the movement of the head assembly having the first and second link parts that are formed bent in a reverse direction contrary to that in the embodiment of FIG. 1.
Figure 19A:
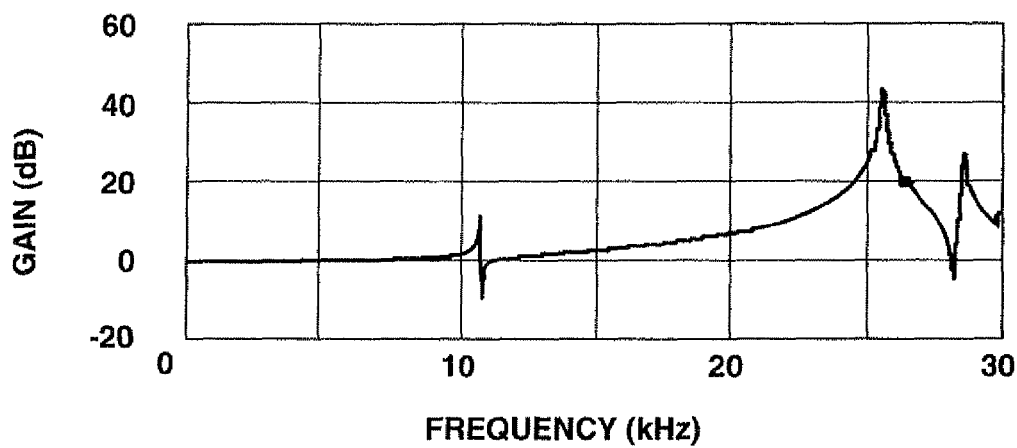
FIG. 19a is a characteristic diagram illustrating gain to frequency change when the first and second link sections have the structure of FIGS. 18a and 18b.
Figure 19B:
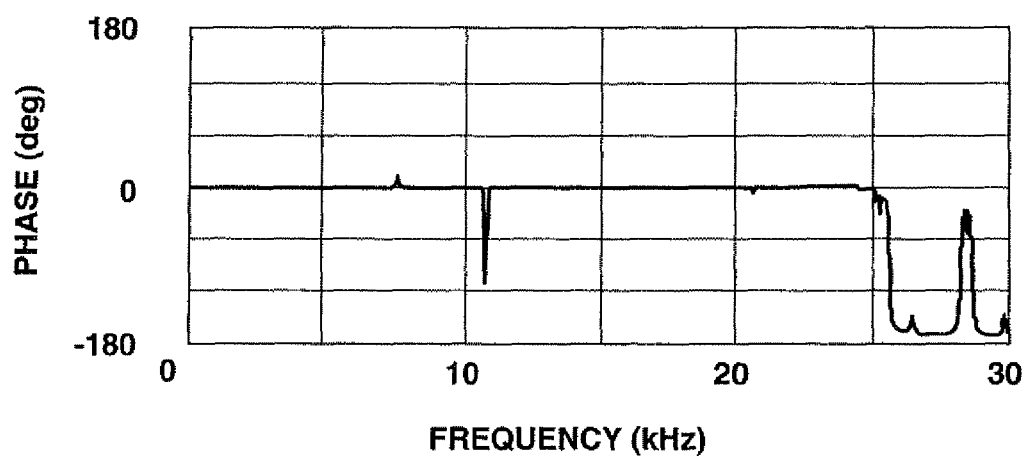
FIG. 19b is a characteristic diagram illustrating phase to frequency change when the first and second link sections have the structure of FIGS. 18a and 18b.

FIGS. 16*a* and 16*b* schematically illustrate movement of the head assembly having the first and second link parts that are formed bent as in the embodiment of FIG. 1. FIGS. 17*a* and 17*b* illustrate gain to frequency change and phase to frequency change of the thin-film magnetic head 14*a* when the first and second link sections have the structure of FIGS. 16*a* and 16*b*, respectively. FIGS. 18*a* and 18*b* schematically illustrate movement of the head assembly having the first and second link parts that are formed bent in a reverse direction contrary to that in the embodiment of FIG. 1. FIGS. 19*a* and 19*b* illustrate gain to frequency change and phase to frequency change of the thin-film magnetic head 14*a* when the first and second link sections have the structure of FIGS. 18*a* and 18*b*, respectively.

As shown in FIGS. 16*a* and 16*b*, if the first link part 33*a*$_3$ (the second link part 33*b*$_3$) is bent to the direction of the flexure substrate 30 opposite to its surface to which the first thin-film piezoelectric elements 23*a* (the second thin-film piezoelectric elements 23*b*) is fixed, the first thin-film piezoelectric element 23*a* (the second first thin-film piezoelectric element 23*b*) buckles or bends, depending upon the expansion and contraction of the thin-film piezoelectric body 91 (92), to a direction of an arrow F1 due to the bimorph effect when it expands, for example, to a bi-directional arrow. At this time, the first link part 33*a*$_3$ (the second link part 33*b*$_3$) also buckles or bends to the same direction as shown by an arrow F2. In this case, as shown in FIGS. 17*a* and 17*b*, no abnormal peak occurs in gain and phase of the thin-film magnetic head 14*a*.

On the other hand, as shown in FIGS. 18*a* and 18*b*, if the outrigger part has a first link part (second link part) that is bent to the direction opposite to that of this embodiment, the first thin-film piezoelectric element (the second first thin-film piezoelectric element) buckles or bends, depending upon the expansion and contraction of the thin-film piezoelectric body, to a direction of an arrow G1 due to the bimorph effect when it expands, for example, to a bi-directional arrow. At this time, the first link part (the second link part) buckles or bends to a direction opposite to the G1 direction, that is a direction of an arrow G2. In this case, as shown in FIGS. 19*a* and 19*b*, an abnormal peak occurs in gain and phase of a thin-film magnetic head.

Therefore, it is desired that the first link part 33*a*$_3$ and the second link part 33*b*$_3$ are formed by bending a part of the metal plate having the first and second outrigger parts 33*a* and 33*b* at a right angle to a direction of the flexure substrate 30 opposite to its surface to which the first and second thin-film piezoelectric elements 23*a* and 23*b* are fixed.

As described above, according to this embodiment, it is configured such that the intersection point of the extended line of the first link part 33*a*$_3$ and the extended line of the second link part 33*b*$_3$ lies at the position of the fulcrum protrusion 21*j*, whereby the instantaneous center of the slider support plate 31 lies at the position of the fulcrum protrusion 21*j*. Therefore, sufficient rigidity can be obtained in the rolling direction and the pitching direction, and the displacement amount of the head element 14*a* can be secured without giving any rotational load with respect to the turning operation of the slider 14 in the yawing direction. Further, by ensuring the preload or internal force of pushing the slider support plate 31 with the slider 14 against the fulcrum protrusion 21*j*, stabilization of the attitude angle of the slider 14 can be achieved and also it is possible to adjust the attitude angle of the slider 14 in the rolling direction and the pitching direction, causing disk damage in the loading/unloading operation to avoid. That is, when micro-displacement control of the head element 14*a* is required for tracking correction on the magnetic disk 11, it can be achieved to maintain the response characteristics of the head element 14*a* at high speed with high precision. Furthermore, it is possible to supply a head assembly and a magnetic disk drive apparatus in which the number of components is reduced to provide reduced weight and reduced size. Moreover, since the slider 14 and the slider support plate 31 turn around the fulcrum protrusion 21*j*, pressure and load applied on the piezoelectric body during operation can be greatly reduced, and thus deterioration or damage of the thin-film piezoelectric element can be prevented resulting durability of the head assembly to greatly improve.

Figure 20:
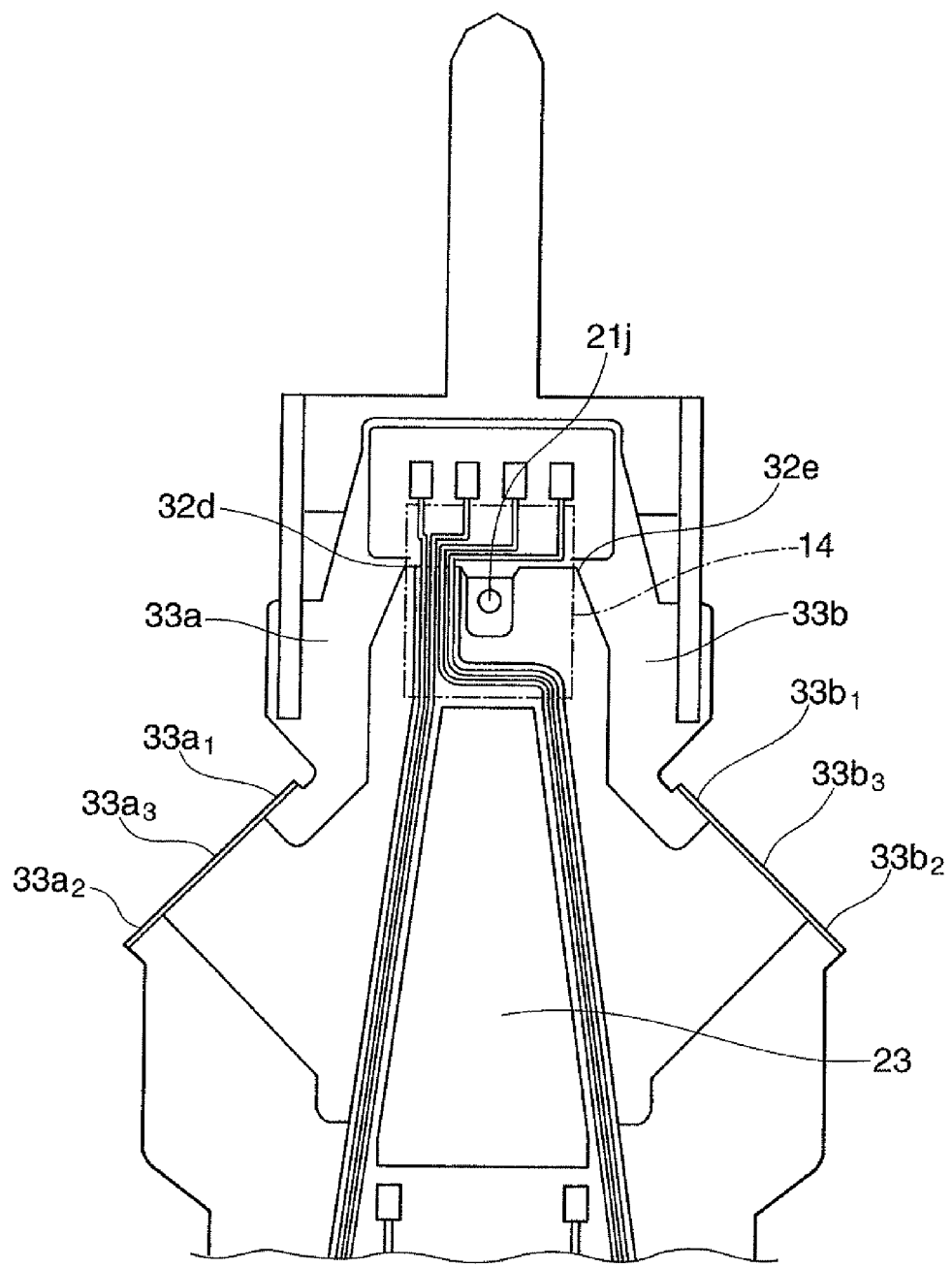
FIG. 20 is a plan view schematically illustrating structure of a top end section of a head assembly in another embodiment of the present invention.
Figure 21A:
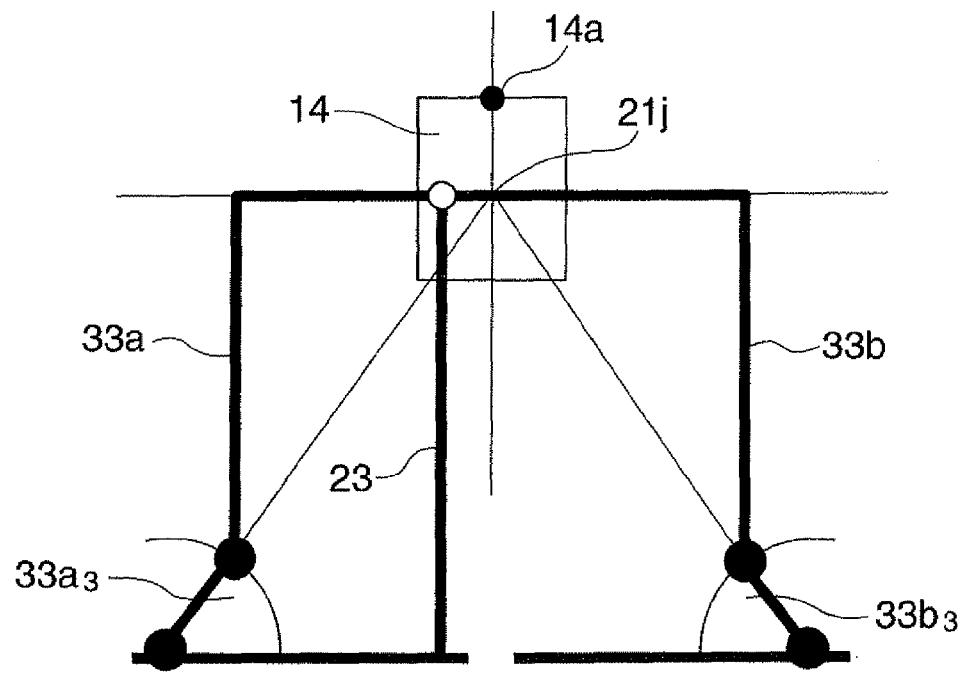
FIG. 21a is a diagram illustrating operation of a link part and a joint part in the embodiment of FIG. 20.
Figure 21B:
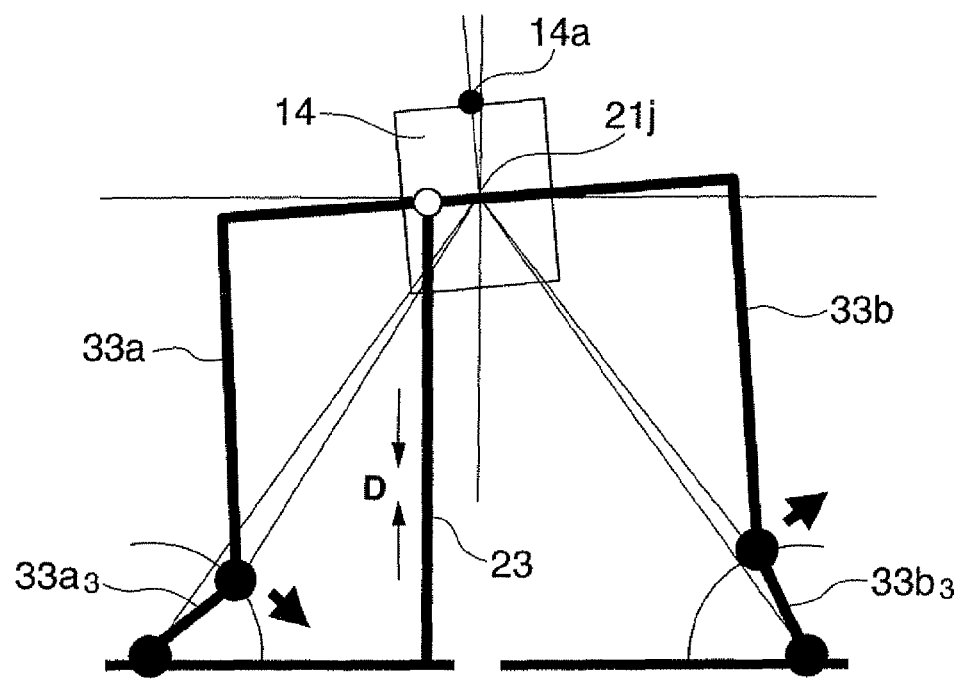
FIG. 21b is a diagram illustrating the operation of the link part and the joint part in the embodiment of FIG. 20.
Figure 22A:
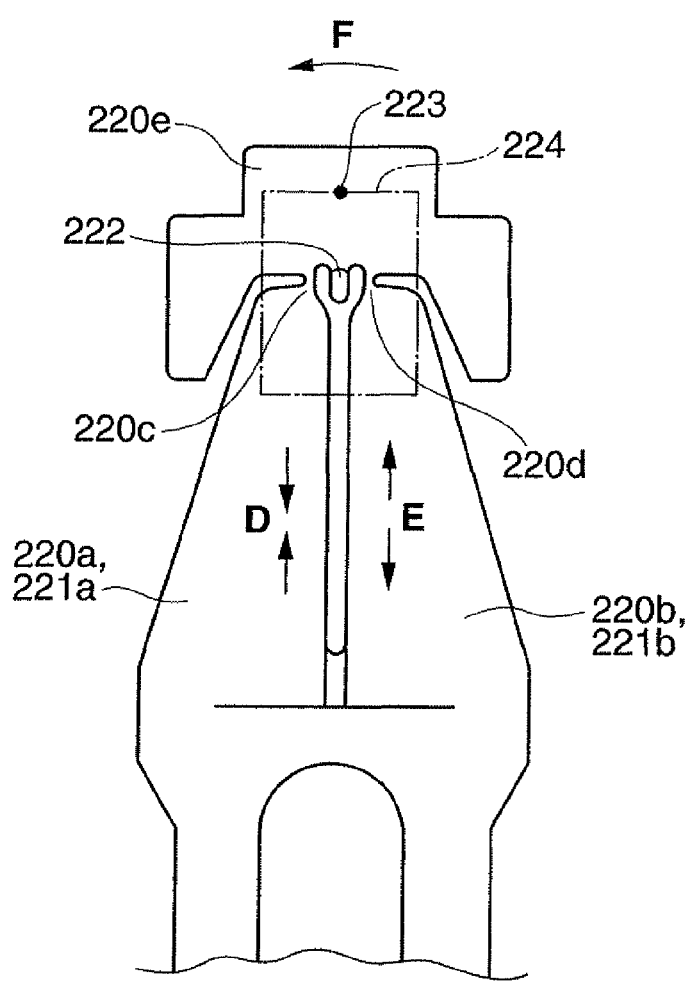
FIG. 22a is a diagram illustrating structure of a conventional micro-displacement mechanism described in Japanese patent publication 2002-324374A.
Figure 22B:
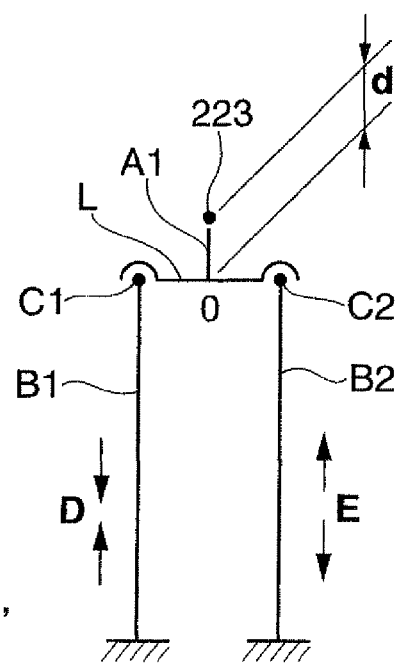
FIG. 22b is a diagram illustrating displacement operation in a conventional micro-displacement mechanism described in Japanese patent publication 2002-324374A.

FIG. 20 schematically illustrates structure of a top end section of a head assembly in another embodiment of the present invention. FIGS. 21*a* and 21*b* illustrate operation in the embodiment of FIG. 20. In this embodiment, the same components as these in the embodiment of FIG. 1 (shown in FIG. 2 or FIG. 5) are designated by the same reference numerals, and the description thereof is omitted.

As shown in these figures, only a single thin-film piezoelectric element 23 is arranged in this embodiment. A wiring pattern for a head element is formed to pass through only the first elastic hinge section 32*d* formed at the right side of the fulcrum protrusion 21*j*. The wiring pattern for a head element may be, of course, formed to pass through only the second elastic hinge section 32*e*. Similarly to the embodiment of FIG. 1 (shown in FIG. 2 or FIG. 5), the intersected point of the extended line of the first link part 33$a_3$ and the extended line of the second link part 33$b_3$ is configured to lie at the position of the fulcrum protrusion 21$j$, whereby the instantaneous center of the slider support plate 31 lies at the position of the fulcrum protrusion 21$j$.

When a voltage is applied to the electrode of the thin-film piezoelectric element 23 and thus the element 23 itself contracts as shown in FIG. 21$b$, the slider support plate 31 turns around the fulcrum protrusion 21$j$ by a link mechanism including the first and second link parts 33$a_3$ and 33$b_3$ as well as the slider support plate 31. As in the case of the embodiment of FIG. 1 (shown in FIG. 2 or FIG. 5), the first and second link parts 33$a_3$ and 33$b_3$ act as a structure for enhancing rigidity in the contraction/expansion direction.

Functions and effects of this embodiment are the same as in the case of the embodiment of FIG. 1 (shown in FIG. 2 or FIG. 5), and further in this embodiment, only one high-cost thin-film piezoelectric element is required causing thereby to lower cost remarkably.

In the embodiments described above, the drive element is configured by a thin-film piezoelectric element. However, in modifications, the drive element of the present invention is not limited to such thin-film piezoelectric element, but a two-dimensional piezoelectric element formed by another fabrication method, so-called bulk-type piezoelectric element may be used, or a capacitance-type drive element may also be used.

In these embodiments, also, the first and second link parts are used as a linking structure having rigidity that makes deformation difficult. However, these first and second link parts may be formed as a coupling structure having elasticity that makes deformation easy. In such case, if both the extended lines of the first and second link parts travel toward a fulcrum position for supporting the slider to freely turn and intersect with each other, the structure can have sufficient rigidity in the rolling direction and the pitching direction, and can secure a certain amount of displacement of the head without giving turning load so much for the turning operation of the slider in the yawing direction.

Further, although the embodiments described above relate to a head assembly and a magnetic disk drive apparatus, the present invention is also applicable to various rotation or turning mechanisms for turning an object to be turned other than the head assembly.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A head assembly comprising:
a slider having a head element;
a load beam;
a fulcrum formed at a top end section of said load beam;
a slider support plate for supporting said slider to freely turn around said fulcrum;
at least one drive element for applying a turning force to said slider support plate in a plane thereof; and
a first outrigger part and a second outrigger part for regulating an attitude angle of said slider support plate in a rolling direction and a pitching direction, and for pushing said slider support plate against said fulcrum, said first outrigger part and said second outrigger part including a first linear link part and a second linear link part, respectively,
said first linear link part having at both ends a first top end joint part mechanically connected to said slider support plate, and a first base end joint part mechanically connected to said load beam; and
said second linear link part having at both ends a second top end joint part mechanically connected to said slider support plate, and a second base end joint part mechanically connected to said load beam,
both of an extended line of said first linear link part and an extended line of said second linear link part traveling toward a position of said fulcrum and intersecting with each other,
wherein each of said first linear link part and said second linear link part is formed by bending a part of a plate member that is integrally formed with said slider support plate, and a bending direction of the part of the plate member is a direction to a surface of the plate member opposite to a surface on which said at least one drive element is mounted.

2. The head assembly as claimed in claim 1, wherein an intersected point of said extended line of said first linear link part and said extended line of said second linear link part substantially lies at the position of said fulcrum.

3. The head assembly as claimed in claim 1, wherein said first linear link part and said second linear link part constitute a rigid linking structure having difficulty in deformation of shape.

4. The head assembly as claimed in claim 1, wherein said first linear link part and said second linear link part constitute an elastic coupling structure having ease in deformation of shape.

5. The head assembly as claimed in claim 1, wherein said first top end joint part, said first base end joint part, said second top end joint part and said second base end joint part comprise portions with locally weakened rigidity.

6. The head assembly as claimed in claim 1, further comprising a flexure with elasticity supported by the load beam, wherein said flexure is integrally formed with said slider support plate so that said slider support plate freely turns.

7. The head assembly as claimed in claim 6, said first and second outrigger parts are integrally formed with said slider support plate and said flexure to couple said flexure to said slider support plate.

8. The head assembly as claimed in claim 6, wherein said at least one drive element comprises at least one thin-film piezoelectric element fixed to a top end section of said flexure.

9. A magnetic disk drive apparatus including a head assembly, and a magnetic disk, said head assembly comprising:
a slider having a head element;
a load beam;
a fulcrum formed at a top end section of said load beam;
a slider support plate for supporting said slider to freely turn around said fulcrum;
at least one drive element for applying a turning force to said slider support plate in a plane thereof; and
a first outrigger part and a second outrigger part for regulating an attitude angle of said slider support plate in a rolling direction and a pitching direction, and for pushing said slider support plate against said fulcrum, said first outrigger part and said second outrigger part including a first linear link part and a second linear link part, respectively,
said first linear link part having at both ends a first top end joint part mechanically connected to said slider support plate, and a first base end joint part mechanically connected to said load beam; and said second linear link part having at both ends a second top end joint part mechanically connected to said slider support plate, and a second base end joint part mechanically connected to said load beam, both of an extended line of said first linear link part and an extended line of said second linear link part traveling toward a position of said fulcrum and intersecting with each other, said slider of said head assembly flying above a surface of said magnetic disk in operation, wherein each of said first linear link part and said second linear link part is formed by bending a part of a plate member that is integrally formed with said slider support plate, and a bending direction of the part of the plate member is a direction to a surface of the plate member opposite to a surface on which said at least one drive element is mounted.

10. A rotation mechanism comprising:

a base substrate;

a fulcrum formed on said base substrate;

a support plate for supporting an object to be turned so that said object is capable of freely turning around said fulcrum;

at least one drive element for applying a turning force to said support plate in a plane thereof; and a first outrigger part and a second outrigger part for regulating an attitude angle of said slider support plate in a rolling direction and a pitching direction, and for pushing said slider support plate against said fulcrum, said first outrigger part and said second outrigger part including a first linear link part and a second linear link part, respectively, said first linear link part having at both ends a first top end joint part mechanically connected to said support plate, and a first base end joint part mechanically connected to said base substrate; and said second linear link part having at both ends a second top end joint part mechanically connected to said support plate, and a second base end joint part mechanically connected to said base substrate, both of an extended line of said first linear link part and an extended line of said second linear link part traveling toward a position of said fulcrum and intersecting with each other, wherein each of said first linear link part and said second linear link part is formed by bending a part of aplate member that is integrally formed with said slider support plate, and a bending direction of the part of the plate member is a direction to a surface of the plate member opposite to a surface on which said at least one drive element is mounted.

11. The rotation mechanism as claimed in claim 10, wherein an intersected point of said extended line of said first linear link part and said extended line of said second linear link part substantially lies at the position of said fulcrum.

* * * * *